(12) United States Patent
Xu et al.

(10) Patent No.: US 10,715,993 B2
(45) Date of Patent: Jul. 14, 2020

(54) ELECTRONIC APPARATUS, INFORMATION PROCESSING DEVICE AND INFORMATION PROCESSING METHOD

(71) Applicant: Sony Corporation, Tokyo (JP)

(72) Inventors: Xiaodong Xu, Beijing (CN); Yunqiu Xiao, Beijing (CN); Yi Zhang, Beijing (CN); Bingshan Hu, Beijing (CN)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/302,673

(22) PCT Filed: Apr. 20, 2017

(86) PCT No.: PCT/CN2017/081207
§ 371 (c)(1),
(2) Date: Nov. 19, 2018

(87) PCT Pub. No.: WO2017/198032
PCT Pub. Date: Nov. 23, 2017

(65) Prior Publication Data
US 2019/0159011 A1    May 23, 2019

(30) Foreign Application Priority Data

May 19, 2016  (CN) .......................... 2016 1 0335178

(51) Int. Cl.
*H04W 8/00* (2009.01)
*H04W 88/04* (2009.01)
(Continued)

(52) U.S. Cl.
CPC ............. *H04W 8/005* (2013.01); *H04L 67/16* (2013.01); *H04W 4/00* (2013.01); *H04W 4/023* (2013.01);
(Continued)

(58) Field of Classification Search
None
See application file for complete search history.

(56) References Cited

U.S. PATENT DOCUMENTS

| 2015/0349926 A1* | 12/2015 | Pollack | .................. H04L 1/188 |
| | | | 714/749 |
| 2016/0198516 A1* | 7/2016 | Kim | ...................... H04W 76/14 |
| | | | 370/312 |

(Continued)

FOREIGN PATENT DOCUMENTS

| CN | 102595658 A | 7/2012 |
| CN | 105450676 A | 3/2016 |

(Continued)

OTHER PUBLICATIONS

English-language translation of International Search Report and Written Opinion for International Application No. PCT/CN2017/081207, dated Jul. 12, 2017.

*Primary Examiner* — Mazda Sabouri
(74) *Attorney, Agent, or Firm* — Xsensus LLP

(57) ABSTRACT

An electronic apparatus used on a user equipment side includes a processing circuit. The processing circuit is configured to select the mode of the relay discovery process of user equipment. In the relay discovery process, the mode determines whether the user equipment, when acting as a relay device, discovers a relayed device or is discovered by a relayed device, or whether the user equipment, when acting as a relayed device, discovers a relay device or is discovered by a relay device. After a connection is established between the relay device and the relayed device, the relayed device obtains a communication service via the relay device by means of a proximity service communication. The processing circuit is further configured to perform control,
(Continued)

so that the user equipment carries out the relay discovery process according to the selected mode.

16 Claims, 14 Drawing Sheets

(51) Int. Cl.
    *H04W 76/14*      (2018.01)
    *H04W 4/00*      (2018.01)
    *H04L 29/08*      (2006.01)
    *H04W 4/02*      (2018.01)
    *H04W 40/22*      (2009.01)
    *H04W 92/18*      (2009.01)

(52) U.S. Cl.
    CPC ........... *H04W 40/22* (2013.01); *H04W 76/14* (2018.02); *H04W 88/04* (2013.01); *H04W 92/18* (2013.01); *Y02D 70/00* (2018.01); *Y02D 70/39* (2018.01)

(56) References Cited

U.S. PATENT DOCUMENTS

| | | | | |
|---|---|---|---|---|
| 2016/0212721 A1* | 7/2016 | Sheng | .................... | H04W 76/14 |
| 2018/0092017 A1* | 3/2018 | Freda | .................... | H04W 76/14 |
| 2018/0098370 A1* | 4/2018 | Bangolae | .............. | H04W 76/14 |
| 2018/0110094 A1* | 4/2018 | Fukuta | .................. | H04W 88/04 |
| 2018/0124674 A1* | 5/2018 | Vutukuri | ............... | H04W 36/30 |
| 2019/0036595 A1* | 1/2019 | Ohtsuji | ................. | H04W 40/12 |

FOREIGN PATENT DOCUMENTS

| | | | |
|---|---|---|---|
| JP | 2005-204213 A | 7/2005 |
| JP | 2007-81498 A | 3/2007 |

* cited by examiner

ELECTRONIC APPARATUS, INFORMATION PROCESSING DEVICE AND INFORMATION PROCESSING METHOD

CROSS-REFERENCE TO RELATED APPLICATIONS

This application is a National Stage Application based on PCT/CN2017/081207, filed on 20 Apr. 2017, and claims priority to Chinese Patent Application No. 201610335178.0, filed on 19 May 2016, the entire contents of which being incorporated herein by reference.

TECHNICAL FIELD

The present disclosure generally relates to the field of wireless communications, and in particular to an electronic device, an information processing device and an information processing method for user equipment side, and an electronic device, an information processing device and an information processing method for base station side.

BACKGROUND

User equipment (UE) to network relay (UE-to-Network Relay) is a hot topic in the Proximity Service Enhancement work item of the 3GPP (3rd Generation Partnership Project) R13. By controlling a remote UE to communicate with a base station via a relay UE, the network coverage can be extended, the transmission rate of a UE at an edge of a cell can be increased, and the spectrum reusability can be improved. Therefore, it is a prospective technology of the LTE-Advanced system.

At present, discovery between UEs in a proximity service may be performed in the following modes.

Mode A

An announcing UE announces its information to surrounding UEs, so as to be discovered by the surrounding UEs.

A monitoring UE monitors information announced by surrounding announcing UEs.

In mode A, the announcing UE announces discovery information at a predetermined discovery information interval. Then the monitoring UE interested in the discovery information receives the information, and decodes and processes the information.

Mode B

A discoverer UE transmits a discovery request message indicating it expects to discover.

A discoveree UE may, after receiving the request message, replay information related to the discovery request message.

Regarding the above discovering modes, there are the following correspondences in the relay discovery of the UE-to-Network Relay: in mode A, a relay UE corresponds to an announcing UE, and a remote UE corresponds to a monitoring UE; in mode B, a remote UE corresponds to a discoverer UE, and a relay UE corresponds to a discoveree UE.

SUMMARY

In the above mode A, for example, a relay UE transmits periodically a discovery message, and a remote UE monitors the discovery message. In the mode B, a remote UE transmits multiple request messages, and a relay UE replays information related to the discovery request. The mode A enables a faster relay discovery, but at the expense of higher power consumption of the relay UE. While Mode B can make relay discovery more energy-efficient, but it will require longer latency for the remote UE to receive a reply message from the relay UE. In addition, the relay UE and the remote UE in different modes cannot discover each other successfully.

However, according to the discussed existing technology, the base station (eNB) does not know the discovering mode that the UE is using. Therefore, the UE can only decide the discovering mode according to its own preferences or needs. If the UE does not analyze the surrounding environment by itself or with the eNB before making the decision, the selected mode may not be optimal due to the inconsistency between the discovering modes, or even result in a very poor effect, such as the following extreme cases.

In a first extreme case, all relay UEs perform relay discovery use mode A, that is, periodically transmit discovery signals, and all remote UEs perform relay discovery use mode B, that is, transmit a discovery request signal and monitor whether there is a reply message.

In a second extreme case, all relay UEs perform relay discovery use mode B, that is, monitor whether there is a remote UE transmitting a discovery request around, and all remote UEs perform relay discovery use mode A, that is, monitor whether there is discovery information from a relay UE.

In the above two cases, the discovering modes selected by the relay UE and the remote UE are inconsistent, resulting in low discovery efficiency and low resource utilization. Because of the absence of centralized control, it is difficult for the mode selected by a UE to be consistent with the modes selected by UEs having the relay discovery needs in the current network, or the imbalance between supply and demand may occur. The difference between the two types of discovering modes is actually the difference between the UE receiving and transmitting the discovery message.

Brief summary of embodiments of the present disclosure is given hereinafter, to provide basic understanding for certain aspects of the present disclosure. It should be understood that, the summary is not exhaustive summary of the present disclosure. The summary is not intended to determine key parts or important parts of the present disclosure, and is not intended to limit the scope of the present disclosure. An object of the summary is only to give some concepts of the present disclosure in a simplified form, as preamble of the detailed description later.

According to an embodiment, an electronic device including a processing circuitry for user equipment side is provided. The processing circuitry is configured to select a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication. The processing circuitry is further configured to control the user equipment to perform the relay discovering process in accordance with the selected mode.

According to another embodiment, an information processing device including a transceiver and a processing circuitry for user equipment side is provided. The processing circuitry is configured to select a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication. The processing circuitry is further configured to control the transceiver to perform the relay discovering process in accordance with the selected mode.

According to yet another embodiment, an information processing method for user equipment side is provided. The method includes a step of selecting a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication. The method further includes a step of performing the relay discovering process in accordance with the selected mode.

According to still another embodiment, an electronic device including a processing circuitry for base station side is provided. The processing circuitry is configured to select a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication. The processing circuitry is further configured to perform control to notify the user equipment of the selected mode.

According to still another embodiment, an information processing device including a transceiver and a processing circuitry for base station side is provided. The processing circuitry is configured to select a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication. The processing circuitry is further configured to control the transceiver to notify the user equipment of the selected mode.

According to still another embodiment, an information processing method for base station side is provided. The method includes a step of selecting a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication. The method further includes a step of notifying the user equipment of the selected mode.

According to the embodiments of the present disclosure, in a discovery process performed by a UE, a discovering mode to be used is selected, thereby improving performance, energy saving, or resource utilization of a discovery process for a UE-to-network relay.

BRIEF DESCRIPTION OF THE DRAWINGS

The present disclosure may be understood better with reference to the description given in conjunction with drawings hereinafter. The same or similar reference numerals are used to indicate the same or similar components throughout all the drawings. The drawings together with the following detailed description are included in the specification, form a part of the specification, and are used to further illustrate preferred embodiments of the present disclosure and explain principles and advantages of the present disclosure by examples. In the drawings.

DETAILED DESCRIPTION OF THE EMBODIMENTS

Figure 1:
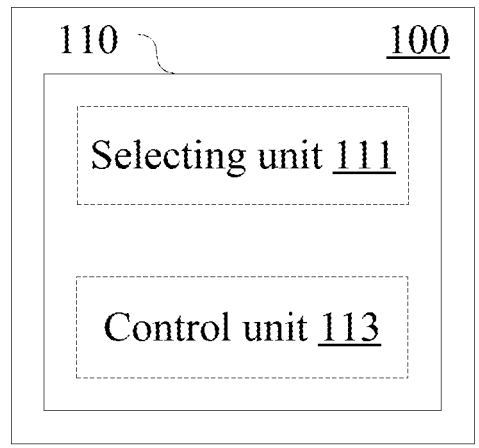
FIG. 1 is a block diagram showing a configuration example of an electronic device for user equipment side according to an embodiment of the present disclosure.

Hereinafter embodiments of the present disclosure are described with reference to the drawings. Elements and features described in one drawing or one embodiment of the present disclosure may be combined with elements and features described in one or more other drawings or embodiments. It should be noted that, indication and description of components and processing which are not related to the present disclosure or well known for those skilled in the art are omitted in the drawings and illustrations for clearness.

As shown in FIG. 1, the electronic device 100 for base station side according to the present embodiment includes a processing circuitry 110. The processing circuitry 110 may be implemented, for example, as a specific chip, a chipset, or a central processing unit (CPU) or the like.

The processing circuitry 110 includes a selecting unit 111 and a control unit 113. It should be noted that although the selecting unit 111 and the control unit 113 are shown in the form of functional blocks in the drawings, it should be understood that the functions of the selecting unit 111 and the control unit 113 may also be implemented by the processing circuitry 110 as a whole, and may not necessarily realized by separate physical components in the processing circuitry 110. In addition, although the processing circuitry 110 is illustrated as one block in the drawing, the electronic device 100 may include multiple processing circuits, and the functions of the selecting unit 111 and the control unit 113 may be distributed into multiple processing circuits, thereby being performed by cooperation between the multiple processing circuits.

The selecting unit 111 is configured to select a mode of the relay discovering process of the user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service (ProSe) communication. The Proximity-based Service communication may include, for example, machine type communication (MTC), device to device (D2D) communication, vehicle to other device (V2X) communication, internet of things (IOT) communication, and the like. The V2X communication may include vehicle-to-vehicle (V2V) communication, vehicle-to-person (V2P) communication, and vehicle-to-infrastructure (V2I) communication, and the like.

That is, the role of the user equipment corresponding to the electronic device according to the embodiment in the relay process may be either a relay device or a remote device, and the role of the user equipment may be determined before performing the discovery process, and the selecting unit 111 selects the mode used in the relay discovering process.

According to an embodiment, the selecting unit 111 selects from the following modes.

Mode A: a relay device transmits a first discovery signal, and a remote device that is to establish a connection with the relay device responds to the first discovery signal.

Mode B: a remote device transmits a second discovery signal, and a relay device that is to establish a connection with the remote device responds to the second discovery signal.

The control unit 113 is configured to control the user equipment to perform a relay discovering process in accordance with the selected mode.

The selecting unit 111 may select a mode based on a detection by the user equipment on discovery signals from other user equipments, or may select a mode in response to an indication from the base station. Next, embodiments corresponding to the two manners will be described.

Figure 2:
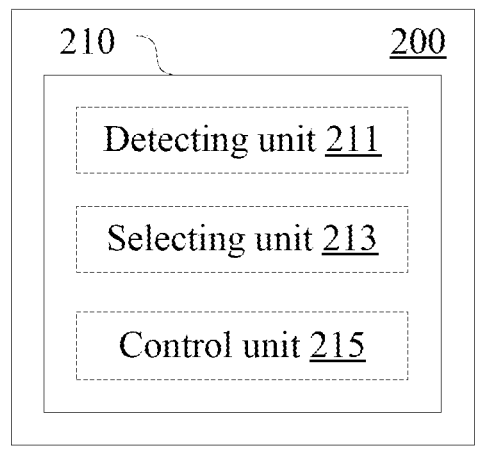
FIG. 2 is a block diagram showing a configuration example of an electronic device for user equipment side according to another embodiment of the present disclosure.

FIG. 2 shows a configuration example of an electronic device for user equipment side according to an embodiment. The electronic device 200 according to the present embodiment includes a processing circuitry 210. The processing circuitry 210 includes a detecting unit 211, a selecting unit 213, and a control unit.

The detecting unit 211 is configured to control the user equipment to detect discovery signals from other user equipments. The selecting unit 213 is configured to select a mode based on the result of the detection. Similarly to the control unit 113, the control unit 215 is configured to control the user equipment to perform a relay discovering process in accordance with the selected mode.

In the mode A as described above, the relay device transmits the first discovery signal, and the remote device that is to establish a connection with the relay device responds to the first discovery signal. In the mode B as described above, the remote device transmits the second discovery signal, and the relay device that is to establish a connection with the remote device responds to the second discovery signal.

According to an embodiment, the detecting unit 211 is configured to control the user equipment to detect the first discovery signal (i.e., the discovery signal sent by other user equipments that are relay devices and use mode A) in the case where the user equipment is the remote device. Accordingly, the selecting unit 213 is configured to select the mode A if the measured intensity of the first discovery signal is higher than a first threshold.

According to another embodiment, the detecting unit 211 is configured to control the user equipment to detect a second discovery signal (i.e., the discovery signal sent by other user equipments that are remote devices and use mode B) in the case where the user equipment is the relay device. Accordingly, the selecting unit 213 is configured to select the mode B if the detected intensity of the second discovery signal is higher than a second threshold.

That is to say, in the above two embodiments, the relay discovering mode of the current user equipment is selected according to the discovery signal strength of other user equipments. When the strength of a type of discovery signal of other user equipments is sufficiently high, it can be determined that there are enough user equipments in the vicinity of the current user equipment that using the relay discovering mode corresponding to the discovery signal, and thus the same relay discovering mode is selected. By selecting the discovering mode to be used according to the measurement of the surrounding environment, it is advantageous to improve the performance, energy saving, resource utilization or the like in the discovery process for the UE-to-network relay.

In addition, different relay discovering modes may be used for different carriers for the Proximity-based Service communication. Accordingly, measurements and mode selections may be performed individually for different carriers. The carrier used for the Proximity-based Service communication includes communication resources for Proximity-based Service discovery. Specifically, the detecting unit 211 and the selecting unit 213 may be configured to perform the above detection and selection individually for each carrier configured for the Proximity-based Service communication. Accordingly, the control unit 215 may control the user equipment to perform the relay discovering process in accordance with the selected mode individually for each carrier.

Next, for purposes of illustration, an example embodiment in which a relay discovering mode is determined by a user equipment itself is described with a specific example. It should be understood that the present disclosure is not limited to the specific details in the examples below.

The receiving resource pool discRxPool for relay discovery is provided by broadcast signaling, and the relay UE and the remote UE may record the discRxPool information after receiving the broadcast signaling. Before a UE (hereinafter, UE may refer to either relay UE or remote UE, unless otherwise specified) initializing a discovery process, the UE may measure the received signal strength on each configured carrier in the discRxPool. Specifically, a relay UE may measure the signal strength of request messages transmitted from the surrounding remote UEs, and a remote UE may measure the signal strength of the announcement messages transmitted from the surrounding relay UEs. Based on the measurement results, the UE can pre-select the discovering mode on each configured carrier.

A parameter SolicitationStrength is defined as signal strength of the discovery request messages transmitted by surrounding remote UEs, which is measured by the relay UE on each configured carrier.

A parameter AnnouncementStrength is defined as signal strength of the discovery announcement messages transmitted by surrounding relay UEs, which is measured by the remote UE on each configured carrier.

A parameter ThresSolicitationStrength is defined as the threshold for SolicitationStrength used by the remote UE, which can be configured by the base station.

If the measurement result of the request message signal received by the relay UE is greater than ThresSolicitationStrength, indicates that there are sufficient remote UEs around the relay UE that transmit request messages on the carrier. Accordingly, the relay UE selecting mode B on this carrier can ensure a sufficient efficiency of the discovery process.

If the measurement result of the request message signal received by the relay UE is smaller than ThresSolicitationStrength, it indicates that only a few remote UEs around the relay UE transmit request messages on the carrier, and accordingly, there may be more remote UEs that are monitoring the discovery message. Therefore, it is predicted that the relay UE selecting mode A on this carrier can ensure a sufficient efficiency of the discovery process.

In addition, a parameter ThresAnnouncementStrength is defined as a threshold value for AnnouncementStrength used by the remote UE, which may be configured by the base station.

If the measurement result of the announcement message signal received by the remote UE is greater than AnnouncementStrength, it is indicated that there are sufficient relay UEs around the remote UE that transmit announcement messages on the carrier. Accordingly, the remote UE selecting mode A on this carrier can ensure a sufficient efficiency of the discovery process.

If the measurement result of the request message signal received by the remote UE is smaller than AnnouncementStrength, indicated that only a few relay UEs around the remote UE transmit request messages on the carrier, instead, there may be more relay UEs that are monitoring discovery messages. In order to improve the success rate of the discovery process, the remote UE should pre-select mode B on this carrier. Accordingly, it is likely that more relay UEs are monitoring discovery messages. Therefore, it is predicted that the remote UE selecting mode B on this carrier can ensure a sufficient efficiency of the discovery process.

For example, in the system information block SIB19, the broadcast discRxPool is as shown in Table 1.

TABLE 1

| Resource Carrier | Resource pool 1 Carrier 1 | Resource pool 2 Carrier 2 |
| --- | --- | --- |

The relay UE measures SolicitationStrength on each configured carrier, and it is assumed that the measurement results are as shown in Table 2.

TABLE 2

| Resource Carrier SolicitationStrength | Resource pool 1 Carrier 1 M1 | Resource pool 2 Carrier 2 M2 |
| --- | --- | --- |

If M1>ThresSolicitationStrength, M2<ThresSolicitationStrength, the relay UE may select mode B on carrier 1 and mode A on carrier 2.

The remote UE measures AnnouncementStrength on au configured carriers, and it is assumed that the measurement results are as shown in Table 3.

TABLE 3

| Resource Carrier AnnouncementStrength | Resource pool 1 Carrier 1 K1 | Resource pool 2 Carrier 2 K2 |
|---|---|---|

If K1>ThresAnnouncementStrength, K2<ThresAnnouncementStrength, the remote UE may select mode A on carrier 1 and select mode B on carrier 2.

Figure 15:
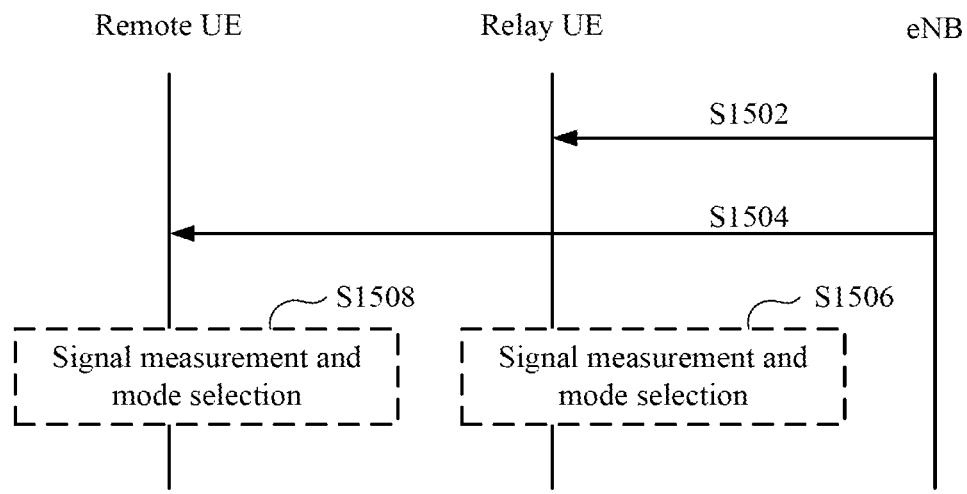
FIG. 15 is a schematic diagram for illustrating an exemplary process performed between a base station and a user equipment.

FIG. 15 shows the corresponding signaling flow diagram. In S1502 and S1504, the base station provides the UE with the information on resource pool for relay discovery, for example, by broadcast signaling. In S1506 and S1508, the relay UE and the remote UE each perform signal measurement and mode selection.

An example embodiment in which the UE side decides the discovering mode is described above. Next, an embodiment of selecting a mode according to an instruction of a base station will be described.

Referring back to FIG. 1, according to an embodiment, the control unit 113 is further configured to control the user equipment to receive an indication for the relay discovering mode from the base station, and the selecting unit 111 may select the relay discovering mode according to the indication from the base station.

The base station may indicate the relay discovering mode of the target user equipment according to, for example, the location of the target user equipment and the relay discovering modes of other user equipments in a predetermined area around the location.

The base station may obtain the location information of the user equipment in multiple manners. For example, the user equipment reports the location information of the user equipment, or the location information of the user equipment is measured by the base station.

According to an embodiment of the electronic device for user equipment side, the control unit 113 is further configured to control the user equipment to transmit information indicating the location of the user equipment to the base station. Thereby, the base station can determine the indication for the relay discovering mode according to the relay discovering modes of user equipments in the predetermined area in which the user equipment lies. In this way, by selecting the discovering mode to be used based on the indication from the base station, it is advantageous to improve the performance, energy saving, resource utilization or the like in the discovery process for the UE-to-network relay.

Next, for the purpose of illustration, an example embodiment of selecting a relay discovering mode in accordance with an indication from the base station is illustrated with a specific example. It should be understood that the present disclosure is not limited to the specific details in the examples below.

It is assumed that the base station knows the discovering mode used by the UEs in the network (for example, for a UE whose relay discovering mode is determined by the base station, the base station knows its relay discovering mode, and for a UE that determines the relay discovering mode by itself, the UE may report the mode to the base station, for example), and can know the distribution of the UEs, thereby having the ability to assistant the UE to decide which mode to use. For example, the base station may notify the UE of the mode by means of new dedicated signaling. This will bring a certain signaling overhead, but it can assistant the UE to perform the relay discovering process more effectively. For example, the signaling may occupy 1 bit, where 0 indicates mode A and 1 indicates mode B.

When a newly initialized UE is to perform relay discovery, it may transmit an application to the base station and report its own geographical location. The base station counts the number of relay UEs or remote UEs around the UE and their used discovering modes, determines an optimal discovering mode, and notifies the UE.

It is assumed that the base station obtains the information of used discovering modes used by UEs in the geographical area with the radius R around the UE that requests the relay discovery as shown in Table 4.

TABLE 4

| UE type | relay UE in mode A | relay UE in mode B | remote UE in mode A | remote UE in mode B |
|---|---|---|---|---|
| UE number | relayA | relayB | remoteA | remoteB |

If the request is sent by a relay UE, the numbers remoteA and remoteB in Table 4 are compared.

If remoteA<remoteB, then this relay UE should select mode B.

If remoteA>remoteB, then this relay UE should select mode A.

If the request is sent by a remote UE, the numbers relayA and relayB in Table 4 are compared.

If relayA<relayB, then this remote UE should select mode B.

If relayA>relayB, then this remote UE should select mode A.

Figure 16:
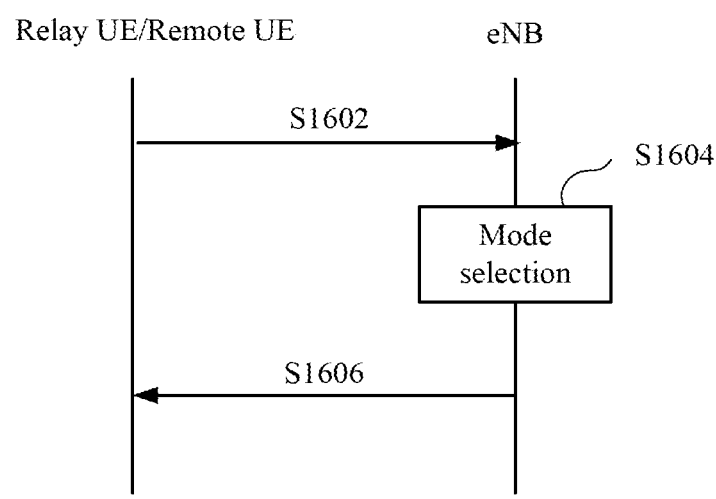
FIG. 16 is a schematic diagram for illustrating another exemplary process performed between a base station and a user equipment.

FIG. 16 shows the corresponding signaling flow diagram. In S1602, the UE transmits a request to the base station. In S1604, the base station performs mode selection. In S1606, the base station transmits an indication of the mode to the UE.

Considering that the distribution of the relay discovering modes of the surrounding UEs may change over time, in an embodiment the selecting unit 111 may be configured to periodically perform the selection of the relay discovering mode.

Figure 17:
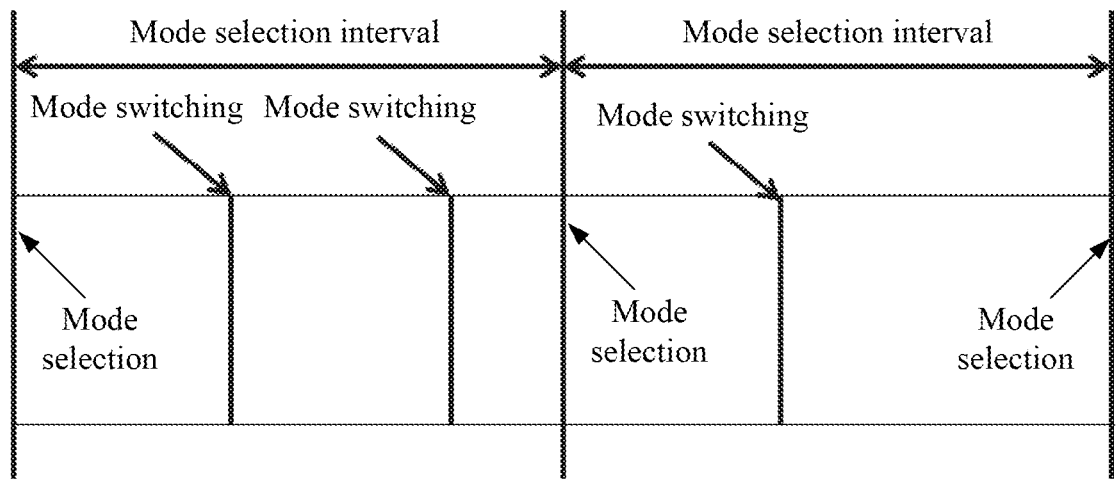
FIG. 17 is a schematic diagram for illustrating mode selection and mode switching.

FIG. 17 schematically shows a mode selection operation performed periodically. In addition, the mode switching operation performed between mode selections is also schematically shown in FIG. 17.

After the discovering mode is selected, in a period of time (before the new mode selection is made), the distribution of users around the UE may change, or the UE itself may move and cause environmental changes. Therefore, the previously selected discovering mode may no longer be suitable. According to an embodiment, after the relay discovering mode is selected, the mode may be switched if the currently selected discovering mode is inappropriate due to, for example, the change of the surrounding environment. The selection and switching of the relay discovering mode may be both performed periodically, and the period of the switching may be a sub-period of the selected period.

Figure 3:
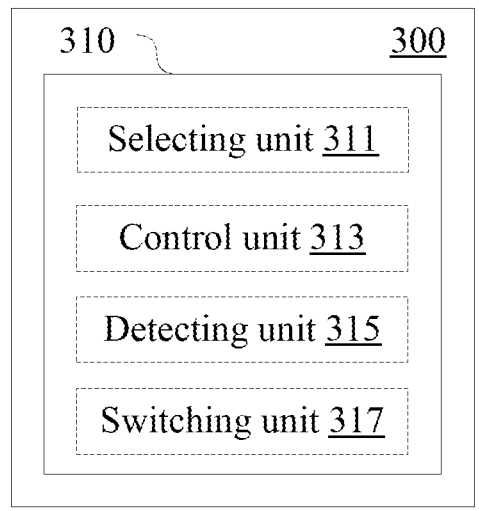
FIG. 3 is a block diagram showing a configuration example of an electronic device for user equipment side according to yet another embodiment of the present disclosure.

As shown in FIG. 3, an electronic device 300 for user equipment side according to an embodiment includes a processing circuitry 310 including a selecting unit 311, a control unit 313, a detecting unit 315, and a switching unit 317. The configuration of the selecting unit 311 and the control unit 313 is similar to the selecting unit 111 and the control unit 113 described above with reference to FIG. 1, and the repeated description is omitted here.

The detecting unit 315 is configured to control the user equipment to detect discovery signals from other user equipments in the case where the relay discovering mode is selected.

The switching unit 317 is configured to switch the selected relay discovering mode according to the change of the discovery signal of the other user equipments detected by the detecting unit 315.

Hereinafter, the relay discovering mode may be switched according to different trigger conditions for the type of the UE (the relay UE or the remote UE) and the relay discovering mode (mode A or mode B) currently selected by the UE. This is designed to assistant the UE to perform discovering mode switching in the case of changes in the surrounding environment, to ensure discovery efficiency and resource efficiency.

For ease of explanation, the following definitions are made.

ΔSolicitationStrength is defined as the rate of change of the SolicitationStrength measured by the relay UE.

ΔSolicitationStrength is defined as the rate of change of the AnnouncementStength measured by the remote UE.

First, the case where the UE is a relay UE is discussed.

1) For a relay UE in mode A

According to an embodiment, the detecting unit 315 is configured to control the user equipment to detect the strength of the second discovery signal (SolicitationStrength) if the selecting unit 311 selects the first mode (mode A) and the user equipment servers as a relay device. The switching unit 317 is configured to switch to the second mode (mode B) if the strength of the second discovery signal is higher than a third threshold and an increasing rate of the intensity (ΔSolicitationStrength) of the second discovery signal is greater than a fourth threshold.

Specifically, the entry condition for performing the mode switching may be expressed as:

SolicitationStrength>ThresSolicitationStrength$_{-\Delta 1}$, and

ΔSolicitationStrength>Δ2 (ΔSolicitationStrength represents the increasing rate, i.e., a larger value indicates a faster increase of the SolicitationStrength).

The leaving condition for this mode switching may be expressed as:

SolicitationStrength<ThresSolicitationStrength$_{-\Delta 1}$

In addition, according to an embodiment, the switching unit 317 may be configured to perform the mode switching if the switching condition is satisfied continuously over a predetermined hysteresis period.

For example, a timer SwitchTimer1 may be maintained, and when the timer overflows, the relay UE is triggered to switch from mode A to mode B.

The above Δ1,Δ2 may be configured by the base station, and the time length of the timer SwitchTimer1 may be an integer multiple of the discovery period. In addition, the timer SwitchTimer1 may be classified into three levels according to the value of ΔSolicitationStrength, as shown in Table 5. Only the relative relationship is given in Table 5, and the specific values may be determined according to the actual situation.

2) For a relay UE in mode B

According to an embodiment, the detecting unit 315 is configured to control the user equipment to detect the strength of the second discovery signal (SolicitationStrength) if the selecting unit 311 selects the second mode (mode B) and the user equipment servers as a relay device. The switching unit 317 is configured to switch to the first mode (mode A) if the strength of the second discovery signal is lower than a fifth threshold and a decreasing rate of the intensity (ΔSolicitationStrength) second discovery signal is greater than a sixth threshold.

Specifically, the entry condition for performing the mode switching may be expressed as:

SolicitationStrength<ThresSolicitationStrength$_{-\Delta 1}$, and

ΔSolicitationStrength>Δ2 (ΔSolicitationStrength represents the decreasing rate, i.e., a larger value indicates a faster decrease of the SolicitationStrength).

The leaving condition for this mode switching may be expressed as:

SolicitationStrength>ThresSolicitationStrength$_{+\Delta}$1.

Similarly, a timer SwitchTimer2 may be maintained, and when the timer overflows, the relay UE is triggered to switch from mode B to mode A.

The configuration of the timer SwitchTimer2 is similar to the timer SwitchTimer1.

Next, a case where the UE is a remote UE will be described.

3) For a remote UE in mode A

According to an embodiment, the detecting unit 315 is configured to control the user equipment to detect the strength of the first discovery signal (AnnouncementStrength) in the case where the selecting unit 311 selects the first mode (mode A) and the user equipment serves as the remote device. The switching unit 317 is configured to switch to the second mode (mode B) if the intensity of the first discovery signal is lower than a seventh threshold and a decreasing rate of the intensity (ΔAnnouncementStrength) of the first discovery signal is greater than an eighth threshold.

Specifically, the entry condition for performing the mode switching may be expressed as:

AnnouncementStrength<AnnouncementStrength$_{-\Delta 3}$, and

ΔAnnouncementStrength>Δ4 (ΔAnnouncementStrength represents the decreasing rate, i.e., a larger value indicates a faster decrease of the AnnouncementStrength).

The leaving condition for this mode switching may be expressed as:

AnnouncementStrength>AnnouncementStrength$_{+\Delta 3}$.

Similarly, a timer SwitchTimer3 may be maintained, and when the timer overflows, the remote UE is triggered to switch from mode A to mode B.

The above Δ3,Δ4 may be configured by the base station, and the time length of the timer SwitchTimer3 may be an integer multiple of the discovery period. In addition, the timer SwitchTimer3 can be classified into three levels according to the value of ΔAnnouncementStrength, as shown in Table 6. Only the relative size relationship is given in Table 6, and the specific setting value can be determined according to the actual situation.

TABLE 5

| ΔSolicitationStrength | SwitchTimer1 |
|---|---|
| large | small |
| medium | medium |
| small | large |

TABLE 6

| ΔAnnouncementStrength | SwitchTimer3 |
|---|---|
| large | small |
| medium | medium |
| small | large |

4) For a remote UE in mode B

According to an embodiment, the detecting unit 315 is configured to control the user equipment to detect the strength of the first discovery signal (Announcement-Strength) if the selecting unit 311 selects the second mode (mode B) and the user equipment servers as the remote device. The switching unit 317 is configured to switch to the first mode (mode A) if the strength of the first discovery signal is greater than a ninth threshold and an increasing rate of the intensity (ΔAnnouncementStrength) of the first discovery signal is greater than a tenth threshold.

Specifically, the entry condition for performing the mode switching may be expressed as:

AnnouncementStrength>AnnouncementStrength$_{+\Delta}$3, and ΔAnnouncementStrength>Δ4 (ΔAnnouncementStrength represents the increasing rate, i.e., a larger value indicates a faster increase of AnnouncementStrength).

The leaving condition for this mode switching may be expressed as:

AnnouncementStrength>AnnouncementStrength$_{-\Delta}$3.

Similarly, a timer SwitchTimer4 may be maintained, and when the timer overflows, the remote UE is triggered to switch from mode B to mode A.

The configuration of the timer SwitchTimer3 is similar to the timer SwitchTimer4.

In addition to discovering mode selection and mode switching, there are other situations. For example, when a UE moves, the surrounding environment does not change much, which is not enough to cause mode switching. In this case, the UE may adjust the discovery parameters to ensure the discovery performance while saving the power consumption of the UE, Accordingly, according to some embodiments of the present disclosure, parameters for relay discovery may also be dynamically adjusted to improve discovery performance, power saving, or resource utilization.

Figure 18:
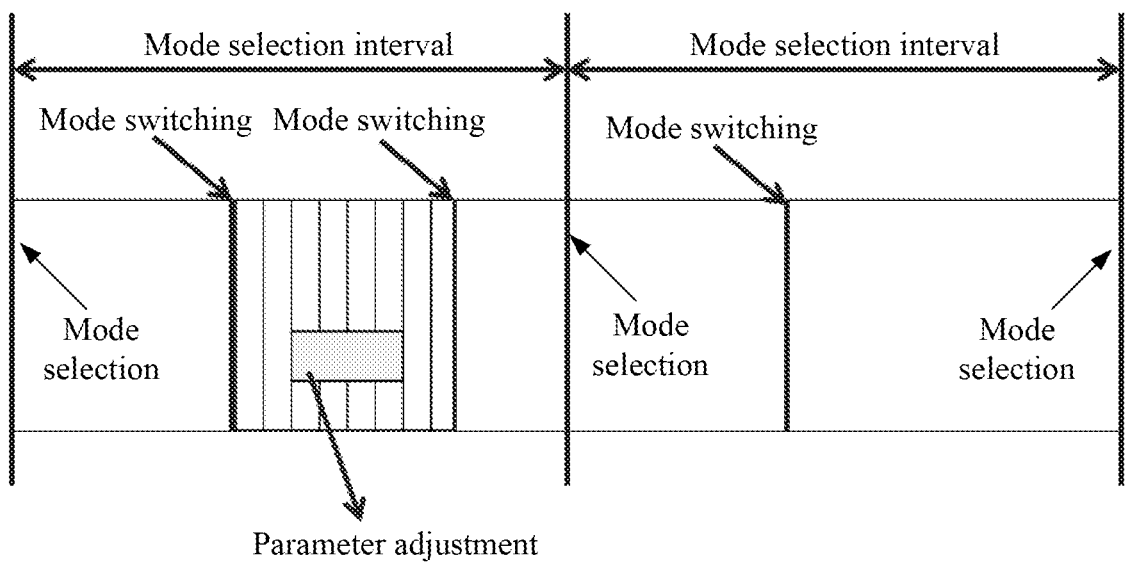
FIG. 18 is a schematic diagram for illustrating mode selection, mode switching and parameter adjustment.

For example, as shown in FIG. 18, the operation of parameter adjustment can be designed, for example, as a short-term process, especially for the case where it is not necessary for the UE to perform mode selection or mode switching. The adjusted discovery-parameters may include, for example, a transmission period of the relay UE in mode A or a request interval time of the remote UE in mode B, and the like.

Figure 4:
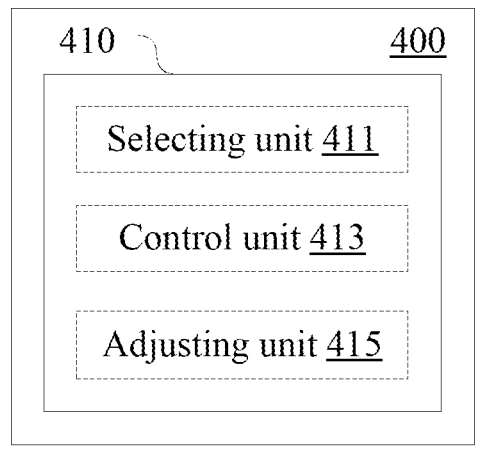
FIG. 4 is a block diagram showing a configuration example of an electronic device for user equipment side according to still another embodiment of the present disclosure.

FIG. 4 shows a configuration example of an electronic device for user equipment side according to an embodiment. The electronic device 400 according to the present embodiment includes a processing circuitry 410. The processing circuitry 410 includes a selecting unit 411, a control unit 413, and an adjusting unit 415. The selecting unit 411 and the control unit 413 have similar configurations as the selecting unit 111 and the control unit 113 explained with reference to FIG. 1, and a repetitive description thereof is omitted herein.

The adjusting unit 415 is configured to adjust, in the case where a relay connection has been established, a parameter for relay discovering according to the communication quality of the relay connection. Additionally, the adjusted parameters may include a transmission period of a relay discovery signal. The communication quality may include a PC5 link quality between the relay device and the remote device.

For a remote UE in mode B, it will transmit a discovery request signal and may receive a reply message. In order to ensure reliable transmission of the discovery message, the discovery request signal needs to be transmitted multiple times until the remote UE receives the reply message or the maximum number of transmissions is reached. The relay UE may adjust the interval time of the discovery request signal according to its own motion state.

For a relay UE in mode A, it periodically transmits an announce signal. If the retransmission period of this announcement signal is short, a faster discovery process can be achieved at the expense of power consumption. If the period is long, the power consumption of the relay UE can be saved, but the performance is deteriorated. Therefore, the relay UE can adjust the retransmission period of its transmission announcement signal according to its own motion situation (or the change of the surrounding environment).

Thus, in accordance with an embodiment of the present disclosure, the method of discovering parameters may be adjusted based on the UE motion state. The adjustment object may include an interval time for retransmitting the discovery request message by the remote UE in mode B, and a retransmission period of the discovery announcement message of the relay UE in mode A. The parameters are adjusted to achieve a balance between energy consumption and discovery performance.

Next, a method for adjusting the relay discovery parameter will be described with reference to a specific example. It should be understood that the present disclosure is not limited to the specific details in the examples below.

First, for the sake of explanation, the following definitions are made.

An interval time is defined as an interval at which the remote UE in mode B performs retransmission of the discovery request message. It is assumed that the initial interval time is T milliseconds before parameter adjustment is performed.

An announcement period is defined as a period at which the relay UE in Mode A performs a retransmission of the discovery announcement message. It is assumed that the initial announcement period is P milliseconds before parameter adjustment is performed.

$PC5_{quality}$ is defined as a PC5 link quality between the remote UE and the relay UE.

$\Delta PC5_{quality}$ is defined as a change rate of the PC5 link quality, which can be positive or negative. If the PC5 link quality is getting better, then $\Delta PC5_{quality}>0$; if the PC5 link quality is getting worse, then $\Delta PC5_{quality}<0$.

$ThresPC5_{quality}A$ is defined as a PC5 link quality threshold for successful discovery between the remote UE and the relay UE in mode A. If the quality of the PC5 link is higher than $ThresPC5_{quality}A$, it indicates that the remote UE can successfully receive the discovery announcement message from the remote UE, that is, the discovery can be successfully completed. $ThresPC5_{quality}A$ may be configured by the base station.

$ThresPC5_{quality}B$ is defined as a PC5 link quality threshold for successful discovery between the remote UE and the relay UE in mode B. If the PC5 link quality is higher than $ThresPC5_{quality}B$, indicates that the relay UE can successfully receive the discovery request message from the remote UE and can successfully reply the message, and thus can complete mutual discovery between the remote UE and the relay UE. $ThresPC5_{quality}B$ may be configured by the base station.

An Effective Discovery Area A is defined an effective area that the relay UE is discovered by the remote UE in Mode A. It may represent a circular area centered at the remote UE, where the PC5 link quality is equal to or greater than $ThresPC5_{quality}A$.

An Effective Discovery Area B is defined as an effective area where the relay UE and the remote UE in mode A discover each other. It may represent a circular area centered at the relay UE, where the PC5 link quality is equal to or greater than ThresPC5$_{quality}$B.

Due to the relative motion between the relay UE and the remote UE, PC5$_{quality}$ between them may have fluctuations due to many factors.

When the remote UE is in the effective discovery area of the relay UE, if a small value of ΔPC5$_{quality}$ is maintained for a period of time, it can be considered that the remote UE and the relay UE are relatively stationary or one of them moves at a low relative speed. In this case, the interval may be increased to achieve a balance between power consumption and discovery performance. If ΔPC5$_{quality}$ is large, it indicates that the relative speed between the remote UE and the relay UE is likely to be high. Thus, the effective discovery time of the remote UE in the effective discovery area B becomes short. Therefore, in order to ensure the discovery performance, the interval time may be reduced to assistant the remote UE to discover the potential relay UE faster.

Figure 19:
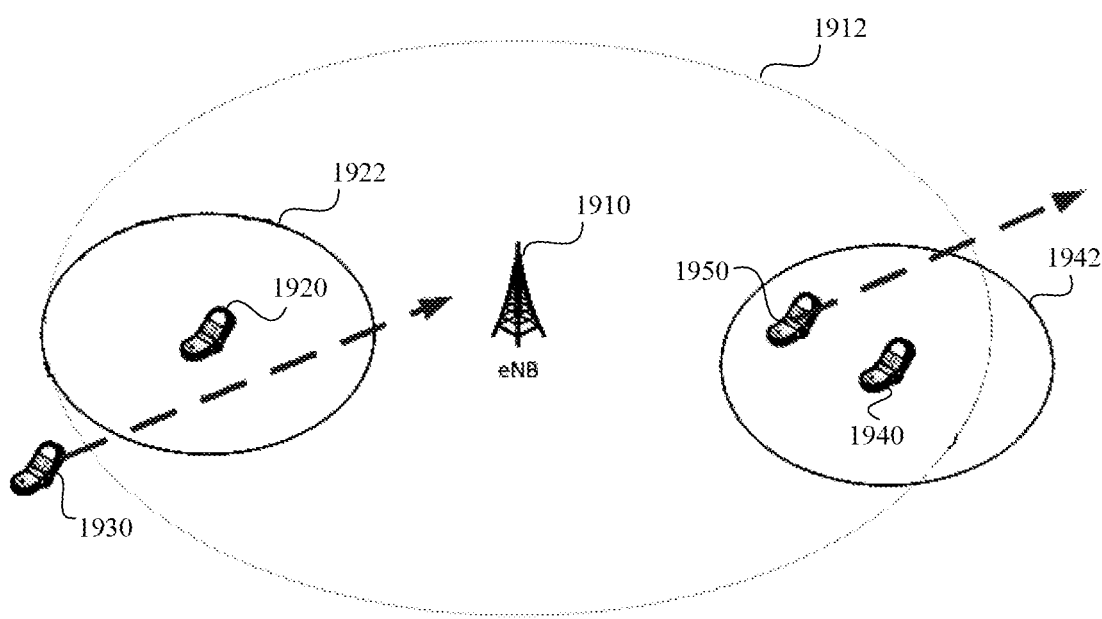
FIG. 19 is a schematic diagram for illustrating relay discovering modes.

As shown in FIG. 19, it is assumed that the remote UE1 1930 is moving from the outside of the coverage of the base station to the inside of the coverage, the relay UE2 1950 is moving from the inside of the coverage of the base station to the outside of the coverage. Both relay UE1 1920 and remote UE2 1940 are stationary or keep moving at a low speed. Due to the relative motion between the relay UE1 (or 2) and the remote UE1 (or 2), the quality of the PC5 link between them changes, so that the relay selection or reselection is triggered in the relay discovering process.

It is assumed that both the remote UE1 1930 and the relay UE1 1920 use mode B for discovery, and both the remote UE2 1940 and the relay UE2 1950 use mode A. It is also assumed that during the movement of each UE, the discovering mode does not change (the mode switching condition is not met). Therefore, the interval time of the remote UE1 1930 and the announcement period of the relay UE2 1950 may be adjusted.

In FIG. 19, the remote UE1 1930 is passing through the effective discovery area 1922 of the UE1 1920. The PC5$_{quality}$ between them will increase first and then decrease. In a case that PC5$_{quality}$ increases and maintains a high value for a period of time, the interval time of the remote UE1 1930 may be appropriately increased to save power consumption. In a case that PC5$_{quality}$ is decreasing, in order to discover the relay UE1 1920 by the remote UE1 1930 more quickly and to ensure that the discovery is completed before the ThresPC5$_{quality}$ decreases to the threshold B, the interval time should be reduced. However, the moving speed of the remote UE1 1930 may be very high, and PC5$_{quality}$ may change rapidly. The effective discovery time of the remote UE1 1930 passing through the effective discovery area 1922 may be short, and may even pass the area 1922 before the parameter adjustment is finished. Therefore, the interval cannot be adjusted too early. Besides, in some scenarios, both the remote UE and the relay UE may be in motion, and their speed and direction of movement may also change irregularly. Therefore, the hysteresis effect may also be taken into account when making parameter adjustments.

Next, two exemplary adjustment events of the remote UE increasing and decreasing the interval time are described.

1) Adjust the interval time of a remote UE in mode B

The following thresholds are defined for the event:

IncThresB: a PC5$_{quality}$ threshold for the remote UE to increase the time interval.

DecThresB: a PC5$_{quality}$ threshold for the remote UE to decrease the time interval.

ThresΔPC5$_{quality}$B: a ΔPC5$_{quality}$ threshold for the remote UE to increase or decrease the time interval, which is of a positive value.

1.1) Interval time increasing event:

Two alternative solutions are defined here.

Solution 1:

Entry condition 1: PC5$_{quality}$>IncThresB+ΔB

Leaving condition 1: PC5$_{quality}$<IncThresB−ΔB

Solution 2:

Enter condition 2: ΔPC5$_{quality}$>ThresΔPC5$_{quality}$B+ΔB

Leaving condition 2: ΔPC5$_{quality}$<ThresΔPC5$_{quality}$B−ΔB

The event can be triggered when the condition of any one of the two solutions is met.

In addition, a timer IncreaseTimerB is defined. When the timer overflows, the event is triggered. The interval time is adjusted to be a*T, where a>1, and a may be configured by the base station.

ΔB and IncreaseTimerB may be configured by the remote UE.

1.2) Interval time decreasing event:

Two alternative solutions are defined here:

Solution 1:

Entry condition 1: PC5$_{quality}$<DecThresB−ΔB

Leaving condition 1: PC5$_{quality}$>DecThresB+ΔB

Solution 2:

Entry condition 2: PC5$_{quality}$<−(ThresΔPC5$_{quality}$B+ΔB)

Leaving condition 2: PC5$_{quality}$>−(ThresΔPC5$_{quality}$B−ΔB)

The event can be triggered when the condition of any one of the two solutions is met.

A timer DecreaseTimerB is defined. When the timer overflows, the event is triggered, and the interval time is adjusted to be b*T, where 0<b<1, and b may be configured by the base station.

DecreaseTimerB is configured in a similar way as IncreaseTimerB.

Figure 20:
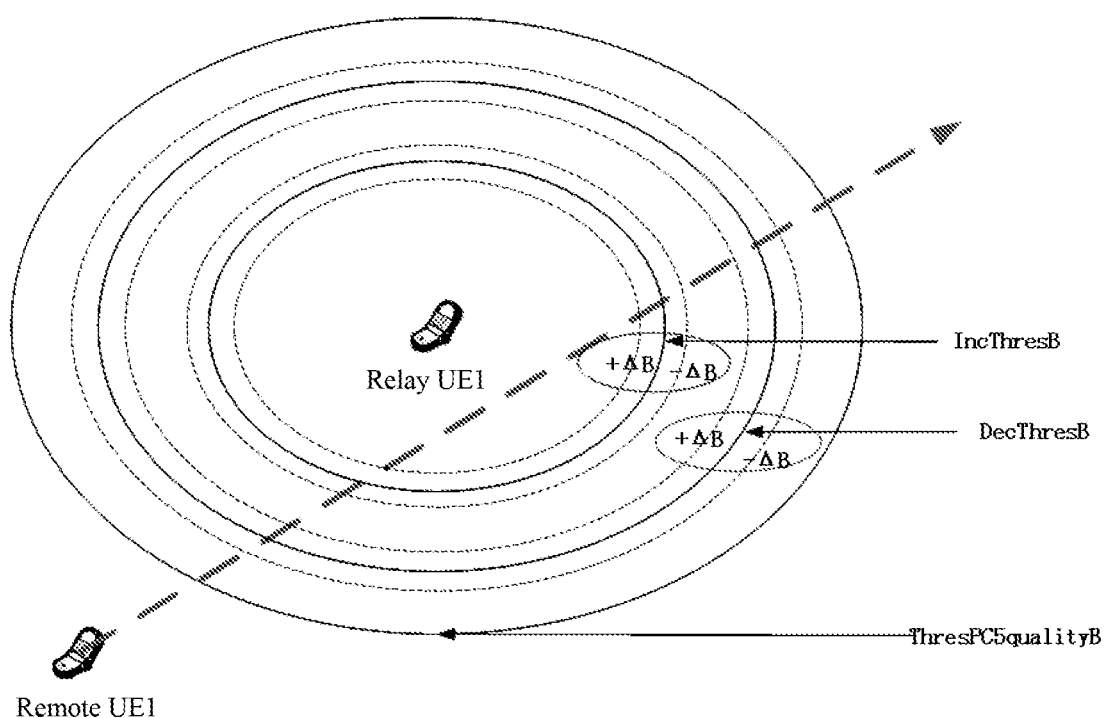
FIG. 20 is a schematic diagram for illustrating adjustment of a relay discovery parameter.

A schematic diagram of the PC5 link quality and the adjustment event of the interval time are shown in FIG. 20.

Referring back to FIG. 19, similarly, in mode A, when the relay UE2 1950 is in the active discovery area 1942 of the remote UE2 1940, if ΔPC5$_{quality}$ is kept at a lower value for a period of time, it can be considered that the remote UE2 1940 is almost static in relative with the relay UE2 1950. In this case, the announcement period may be increased to achieve a balance between power consumption and discovery performance. If ΔPC5$_{quality}$ is high, it indicates that the relative speed between the remote UE2 1940 and the relay UE2 1950 is relatively high, so that the effective time of the relay UE2 1950 passing through the effective discovery area 1940 will be small. Therefore, in order to ensure the discovery performance, the announcement period should be decreased. Two adjustment events are designed here for the relay UE to increase and decrease the announcement period.

2) Adjusting the announcement period of the relay UE in mode A

The following thresholds are defined for the event.

IncThresA is the PC5$_{quality}$ threshold for the relay UE to increase the announcement period.

DecThresA is the PC5$_{quality}$ threshold for the relay UE to decrease the announcement period.

ThresΔPC5$_{quality}$A is the ΔPC5$_{quality}$ threshold for the relay UE to increase or decrease the announcement period, which is of a positive value.

2.1) Announcement period increasing event:
Two alternative solutions are defined here:
Solution 1:
Entry condition 1: $PC5_{quality} > IncThresA + \Delta A$
Leaving condition 1: $PC5_{quality} < IncThresA - \Delta A$
Solution 2:
Entry condition 2: $\Delta PC5_{quality} > Thres\Delta PC5_{quality}A + \Delta A$
Leaving condition 2: $\Delta PC5_{quality} < Thres\Delta PC5_{quality}A - \Delta A$
The event can be triggered when the condition of any one of the two solutions is met.

Also, a timer IncreaseTimerA is defined. When the timer overflows, the event is triggered and the announcement period is adjusted to be c*P, where c>1, and c can be configured by the base station.

$\Delta A$ and IncreaseTimerA may be configured by the relay UE.

2.2) Announcement period increasing event:
Similarly, two alternative solutions are defined here:
Solution 1:
Entry condition 1: $PC5_{quality} < DecThresA - \Delta A$
Leaving condition 1: $PC5_{quality} > DecThresA + \Delta A$
Solution 2:
Enter condition 2: $\Delta PC5_{quality} < -(Thres\Delta PC5_{quality}A + \Delta A)$
Leaving condition 2: $\Delta PC5_{quality} > -(Thres\Delta PC5_{quality}A - \Delta A)$
The event can be triggered when the condition of any one of the two solutions is met.

Also, a timer DecreaseTimerA is defined. When the timer overflows, the event is triggered, and the announcement period is adjusted to be d*P, where 0<d<1, and d can be configured by the base station.

DecreaseTimerA is configured in a similar way as IncreaseTimerA.

Figure 21:
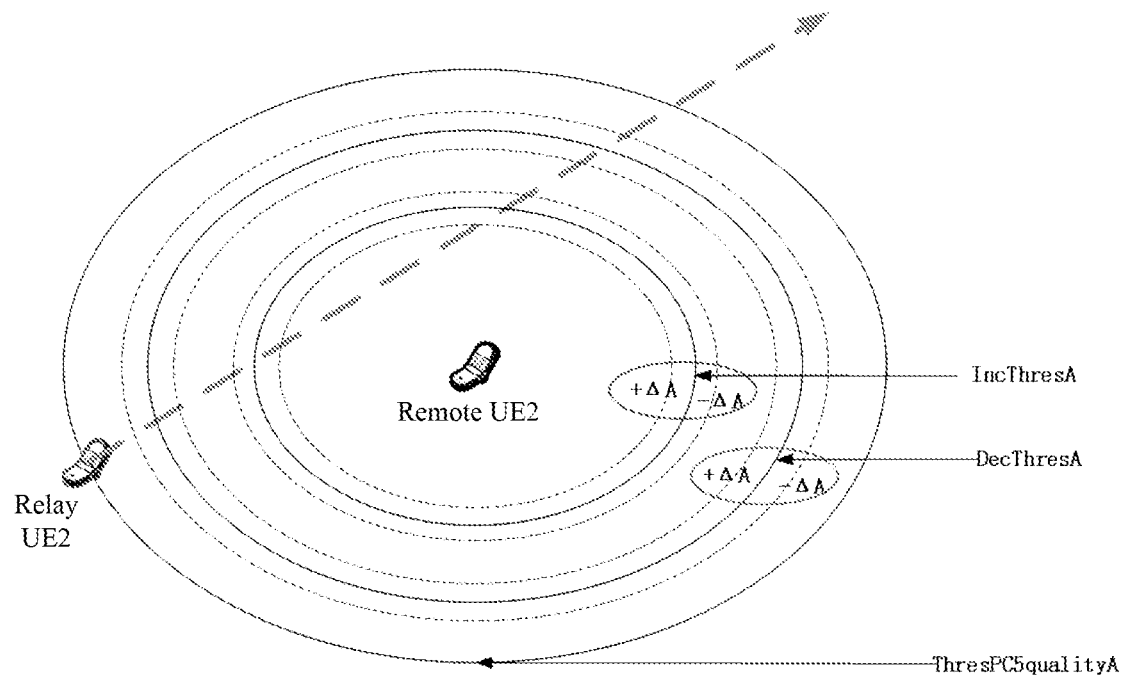
FIG. 21 is a schematic diagram for illustrating adjustment of a relay discovery parameter.

A schematic diagram of the PC5 link quality and the adjustment event of announcement period are shown in FIG. 21.

Further, according to an embodiment, in a case where two or more relay connections are established, the adjusting unit 415 may adjust the relay discovery parameters according to the average communication quality of the two or more relay connections.

Figure 22:
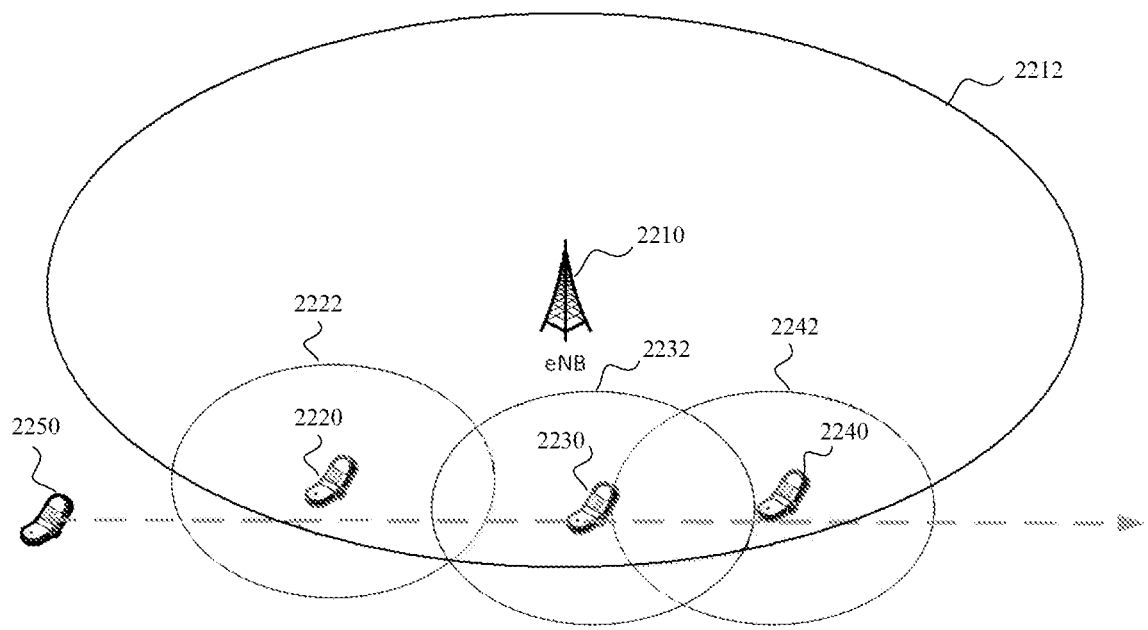
FIG. 22 is a schematic diagram for illustrating adjustment of a relay discovery parameter.

For example, in another example scenario as shown in FIG. 22, the remote UE 2250 is passing through the active areas (indicated by 2222, 2232, 2242) of several relay UEs 2220, 2230, 2240, and these areas partially overlap. $PC5_{quality}$ between the remote UE 2250 and a relay UE is different from $PC5_{quality}$ between the remote UE 2250 and another relay UE, that is, there are multiple $PC5_{quality}$ values. Therefore, in performing the parameter adjustment on the remote UE 2250, instead of using the change of only one $PC5_{quality}$ to perform the adjustment, the time interval parameter may be adjusted based on the average value of multiple $PC5_{quality}$ values or the average value of $\Delta PC5_{quality}$ values.

As shown in FIG. 22, when the remote UE 2250 passes through the effective discovery areas 2232 and 2242, the $PC5_{quality}2$ between the remote UE 2250 and the relay UE 2230 may decrease, and the $PC5_{quality}3$ between the remote UE 2250 and the relay UE 2240 may increase. Therefore, the remote UE 2250 may utilize $(PC5_{quality}2 + PC5_{quality}3)/2$ to adjust the interval time.

Similarly, when the relay UE passes through the effective discovery areas of several remote UEs, the relay UE may also utilize an average value of multiple $PC5_{quality}$ to adjust the announcement period.

The above examples illustrate the embodiments of an electronic device on the user equipment side according to the present disclosure. In addition, the embodiment of the present disclosure further includes an information processing device for the user equipment side.

Figure 5:
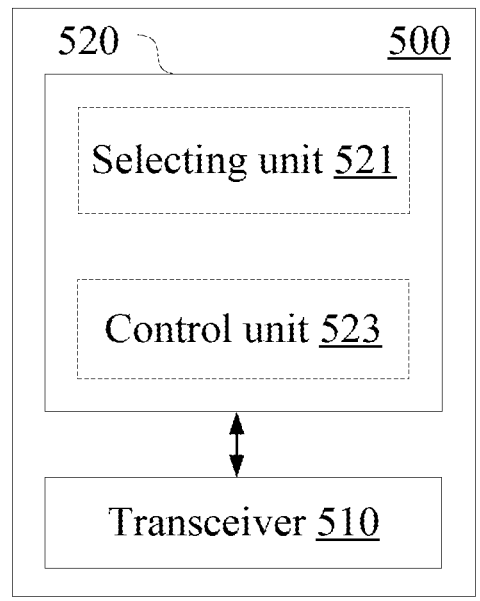
FIG. 5 is a block diagram showing a configuration example of an information processing device for user equipment side according to an embodiment of the present disclosure.

As shown in FIG. 5, the information processing device 500 according to the present embodiment includes a transceiver 510 and a processing circuitry 520, and the processing circuitry 520 includes a selecting unit 521 and a control unit 523.

The selecting unit 521 is configured to select a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication.

The control unit 523 is configured to control the transceiver 510 to perform the relay discovering process in accordance with the selected mode.

A more specific configuration of the processing circuitry 520 is similar to the previous embodiment for the electronic device, and a repetitive description thereof is omitted herein.

In the above description of the electronic device and the information processing device according to the embodiments of the present disclosure, it is apparent that some processes and methods are also disclosed. Next, an explanation of an information processing method for the user equipment side according to an embodiment of the present disclosure will be given, without repeating the specific details that have been described above.

Figure 6:
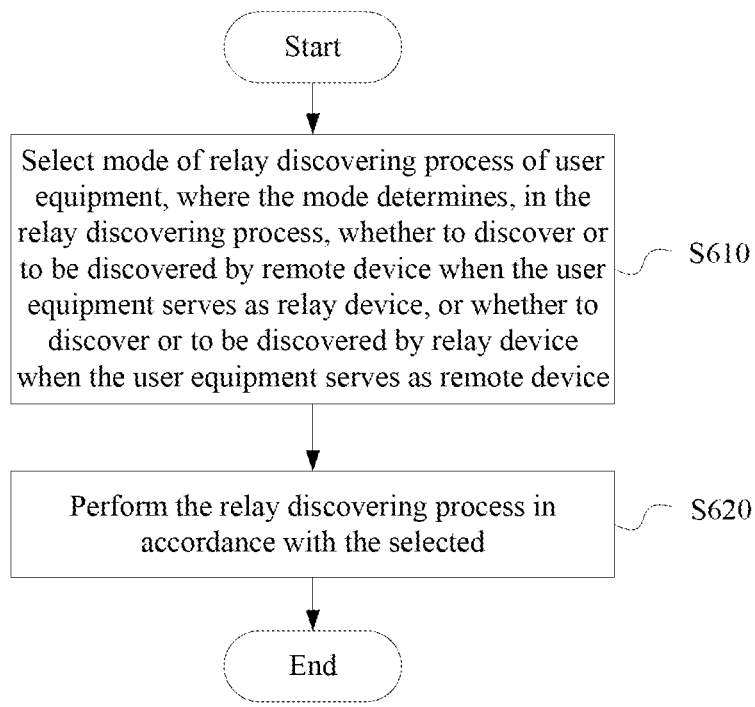
FIG. 6 is a flowchart showing a process example of an information processing method for user equipment side according to an embodiment of the present disclosure.

As shown in FIG. 6, an information processing method for user equipment side according to an embodiment includes the following steps S610 and S620.

In S610, a mode of the relay discovering process of a user equipment is selected. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication.

In S620, the relay discovering process is performed in accordance with the selected mode.

In addition, the embodiment of the present disclosure further includes an electronic device, an information processing device, and an information processing method for the base station side. In the following description of the embodiments, details corresponding to the details described above for the embodiments for the user equipment side are omitted.

Figure 7:
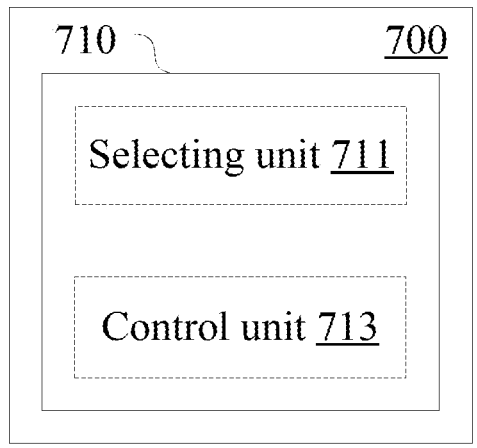
FIG. 7 is a block diagram showing a configuration example of an electronic device for base station side according to an embodiment of the present disclosure.

As shown in FIG. 7, an electronic device 700 for base station side according to an embodiment includes a processing circuitry 710 including a selecting unit 711 and a control unit 713.

The selecting unit 711 is configured to select a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication.

The control unit 713 is configured to perform control to notify the user equipment of the selected mode.

Figure 8:
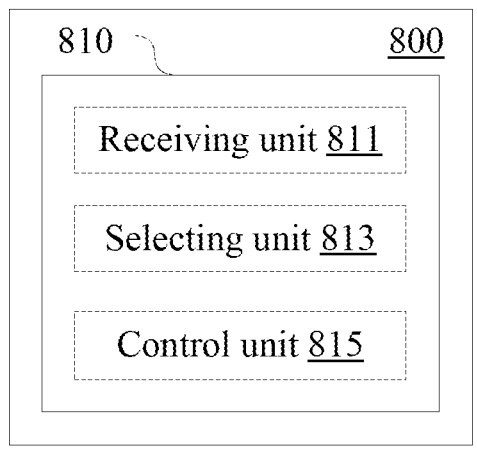
FIG. 8 is a block diagram showing a configuration example of an electronic device for base station side according to another embodiment of the present disclosure.

FIG. 8 shows an electronic device for base station side according to another embodiment. The electronic device 800 according to the present embodiment includes a processing circuitry 810 including a receiving unit 811, a selecting unit 813, and a control unit 815. The selecting unit 813 and the control unit 815 are similar to the selecting unit 711 and the control unit 713 described with reference to FIG. 7.

The receiving unit 811 is configured to control the base station to receive information indicating the location of the user equipment from the user equipment. The selecting unit 813 performs selection of the relay discovering mode based on relay discovering modes of user equipments in a predetermined area in which the user equipment lies.

Figure 9:
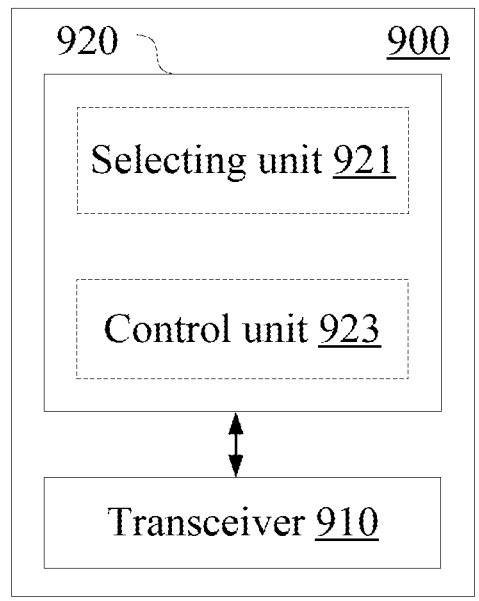
FIG. 9 is a block diagram showing a configuration example of an information processing device for base station side according to an embodiment of the present disclosure.

As shown in FIG. 9, an information processing device 900 for base station side according to an embodiment includes a transceiver 910 and a processing circuitry 920, and the processing circuitry 920 includes a selecting unit 921 and a control unit 922.

The selecting unit 921 is configured to select a mode of a relay discovering process of a user equipment. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication.

The control unit 922 is configured to control the transceiver 910 to notify the user equipment of the selected mode.

Figure 10:
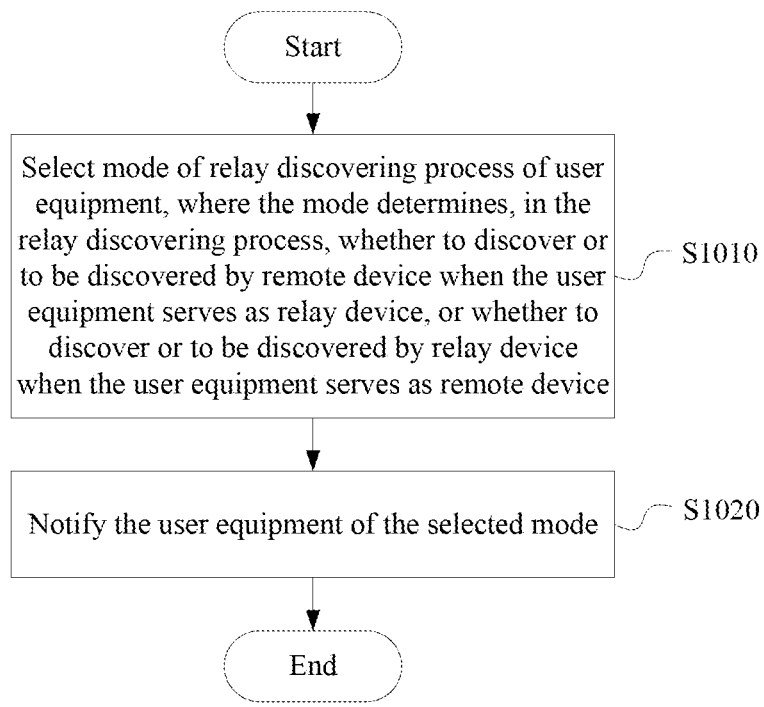
FIG. 10 is a flowchart showing a process example of an information processing method for base station side according to an embodiment of the present disclosure.

As shown in FIG. 10, an information processing method for base station side according to an embodiment includes the following steps S1010 and S1020.

In S1010, a mode of a relay discovering process of a user equipment is selected. The mode determines, in the relay discovering process, whether to discover a remote device or to be discovered by a remote device when the user equipment serves as a relay device, or whether to discover a relay device or to be discovered by a relay device when the user equipment serves as a remote device. After a connection is established between the relay device and the remote device, the remote device obtains a communication service via the relay device through a Proximity-based Service communication.

In S1020, the selected mode is notified to the user equipment.

Figure 11:
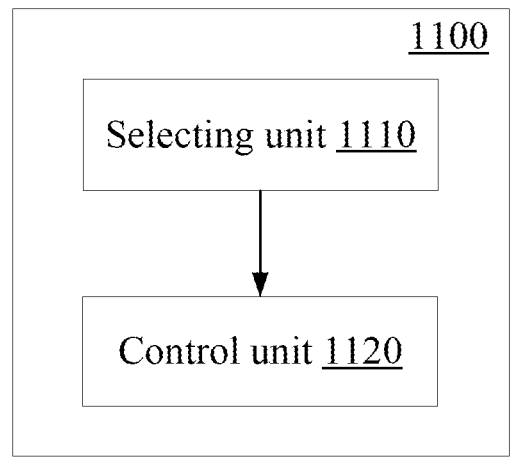
FIG. 11 is a block diagram showing a configuration example of an electronic device for user equipment side according to an embodiment of the present disclosure.
Figure 12:
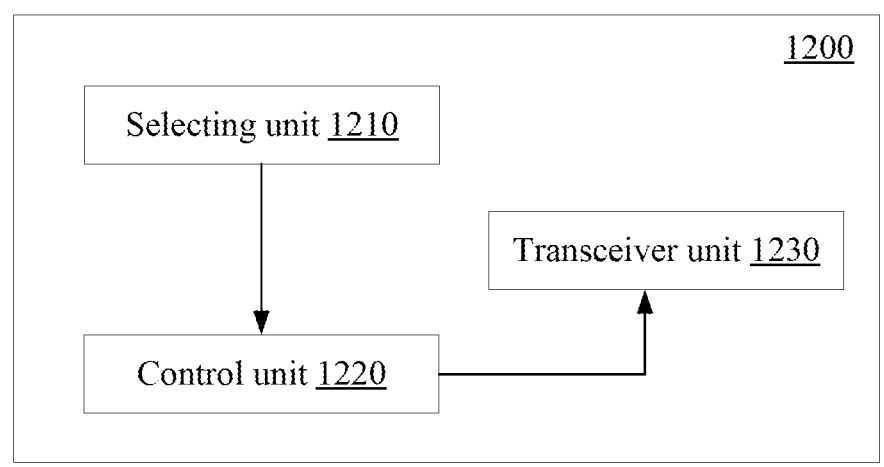
FIG. 12 is a block diagram showing a configuration example of an information processing device for user equipment side according to an embodiment of the present disclosure.

FIGS. 11 and 12 show configuration examples of embodiments of an electronic device and an information processing device for user equipment side.

As shown in FIG. 11, an electronic device 1100 for user equipment side according to an embodiment includes a selecting unit 1110 and a control unit 1120. The selecting unit 1110 is configured to select a mode of a relay discovering process of a user equipment. The control unit 1120 is configured to control the user equipment to perform the relay discovering process in accordance with the selected mode.

As shown in FIG. 12, the information processing device 1200 for the user equipment side according to an embodiment includes a selecting unit 1210, a control unit 1220, and a transceiver unit 1230. The selecting unit 1210 is configured to select a mode of a relay discovering process of a user equipment. The control unit 1220 is configured to control the transceiver unit 1230 to perform the relay discovering process in accordance with the selected mode.

Figure 13:
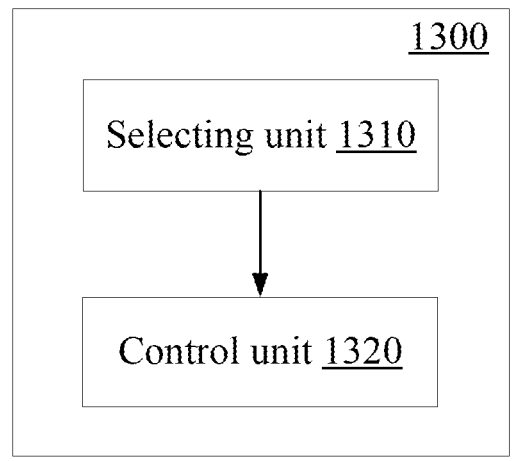
FIG. 13 is a block diagram showing a configuration example of an electronic device for base station side according to an embodiment of the present disclosure.
Figure 14:
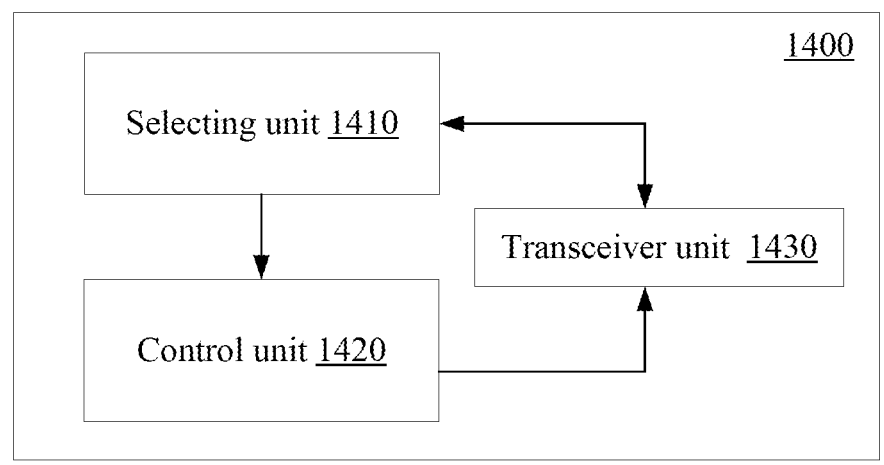
FIG. 14 is a block diagram showing a configuration example of an information processing device for base station side according to an embodiment of the present disclosure.

Further, FIGS. 13 and 14 show configuration examples of an electronic device and an information processing device for the base station side.

As shown in FIG. 13, an electronic device 1300 for base station side according to an embodiment includes a selecting unit 1310 and a control unit 1320. The selecting unit 1310 is configured to select a mode of a relay discovering process of a user equipment. The control unit 1320 is configured to control to notify the user equipment of the selected mode.

As shown in FIG. 14, an information processing device 1400 for a base station side according to an embodiment includes a selecting unit 1410, a control unit 1420, and a transceiver unit 1430. The selecting unit 1410 is configured to select a mode of a relay discovering process of a user equipment. The control unit 1420 is configured to control the transceiver unit 1430 to notify the user equipment of the selected mode.

As an example, various steps of the methods above and various modules and/or units of the apparatuses above may be implemented as software, firmware, hardware or a combination thereof hi a case of implementing by software or firmware, programs consisting of the software for implementing the methods above are installed to a computer with a dedicated hardware structure (for example a general-purpose computer 2300 shown in FIG. 23) from the storage medium or the network. The computer can perform various types of functions when installed with various types of programs.

Figure 23:
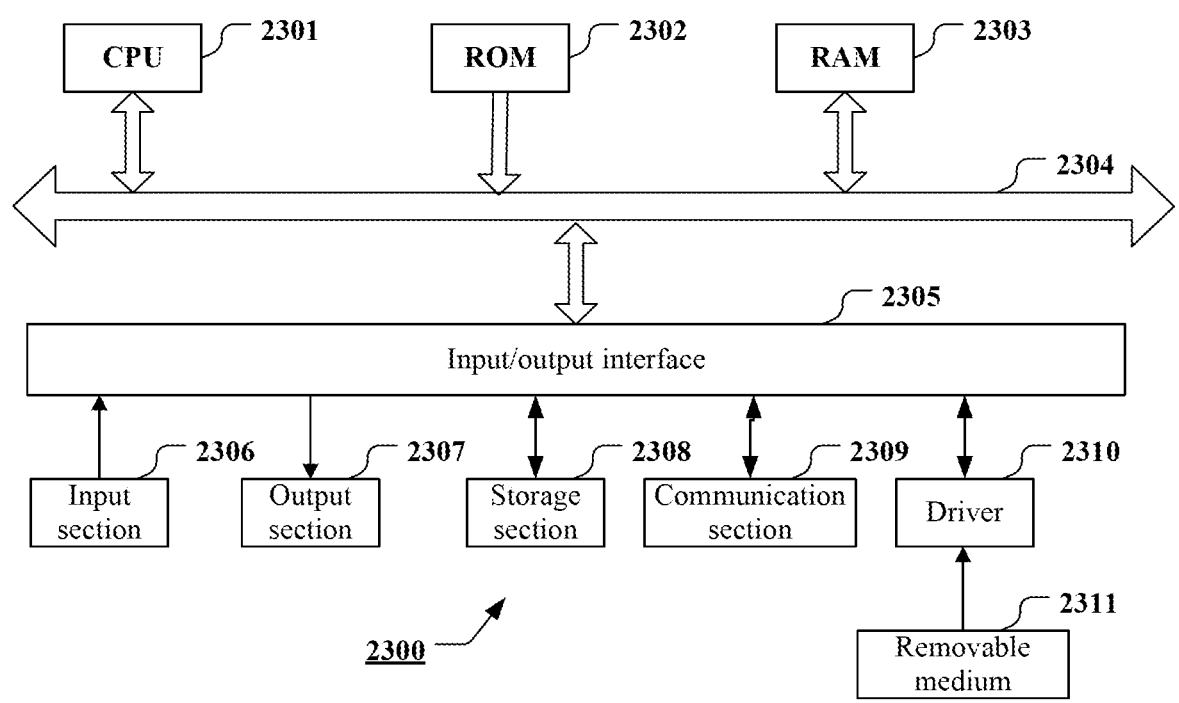
FIG. 23 is a block diagram showing an exemplary structure of a computer for implementing the method and device according to the present disclosure.

In FIG. 23, a central processing unit (CPU) 2301 performs various types of processing according to programs stored in a read only memory (ROM) 2302 or programs loaded from a storage section 2308 to a random access memory (RAM) 2303. Data required when the CPU 2301 performs various types of processing is also stored in the RAM 2303 as needed. The CPU 2301, the ROM 2302 and the RAM 2303 are linked to each other via a bus 2304. An input/output interface 2305 is also linked to the bus 2304.

The following components are linked to the input/output interface 2305: an input section 2306 (including a keyboard, and a mouse and so on), an output section 2307 (including a display, for example a cathode ray tube (CRT) and a liquid crystal display (LCD), and a loudspeaker), a storage section 2308 (including a hard disk and so on), and a communication section 2309 (including a network interface card for example a LAN card, and a modem). The communication section 2309 performs communication processing via a network for example the Internet. A driver 2310 may also be linked to the input/output interface 2305 as needed. A removable medium 2311 for example a magnetic disk, an optical disk, a magnetic-optical disk and a semiconductor memory may be installed on the driver 2310 as needed, such that computer programs read from the removable medium 2311 are installed on the storage section 2308 as needed.

In a case of performing the series of processing described above by software, programs consisting of the software are installed from the network for example the Internet or the storage medium for example the removable medium 2311.

Those skilled in the art should understand that the storage medium is not limited to the removable medium 2311 shown in FIG. 23 which stores programs and is distributed separately from the device to provide the programs to the user. Examples of the removable medium 2311 include: a magnetic disk (including a floppy disk (registered trademark)), an optical disk (including a compact disk read only memory (CD-ROM) and a digital versatile disk (DVD)), a magnetic-optical disk (including a mini disk (MD) (registered trademark)), and a semiconductor memory. Alternatively, the storage medium may be a hard disk included in the ROM 2302 and the storage section 2308 which stores programs. The storage medium and the device including thereof together are distributed to the user.

A program product storing machine readable instruction codes is further provided according to the embodiments of the present disclosure. When read and executed by a machine, the instruction codes cause the machine to perform the method according to the embodiment of the present disclosure.

Accordingly, a storage medium for carrying the program product storing the machine readable instruction codes is further provided according to the present disclosure. The storage medium includes but not limited to a floppy disk, an optical disk, a magnetic-optical disk, a storage card and a memory stick and so on.

The embodiments of the present disclosure further relate to an electronic device in the following. In a case where the electronic device is for base station side, the electronic device may be implemented as any type of evolved node B (eNB), such as a macro eNB and a small eNB. The small eNB may be an eNB covering a cell smaller than a macro cell, such as a pico eNB, a micro eNB and a home (femto) eNB. Alternatively, the electronic device may be implemented as any other type of base stations, such as a NodeB and a base transceiver station (BTS). The electronic device may include: a body configured to control wireless communication (also referred to as a base station device); and one or more remote radio heads (RRH) located at positions different from the body. In addition, various types of terminals described in the following each may function as a base station to operate by performing functions of the base station temporarily or in a semi-permanent manner.

In a case where the electronic device is for the user equipment side, the electronic device may be implemented as mobile terminals (such as a smart phone, a tablet personal computer (PC), a notebook PC, a portable game terminal, a portable/dongle mobile router and a digital camera) or a vehicle terminal (such as an automobile navigation device). In addition, the electronic device may be a wireless communication module installed on each of the above terminals (such as an integrated circuit module including one or more chips).

Application Example of a Terminal Device

Figure 24:
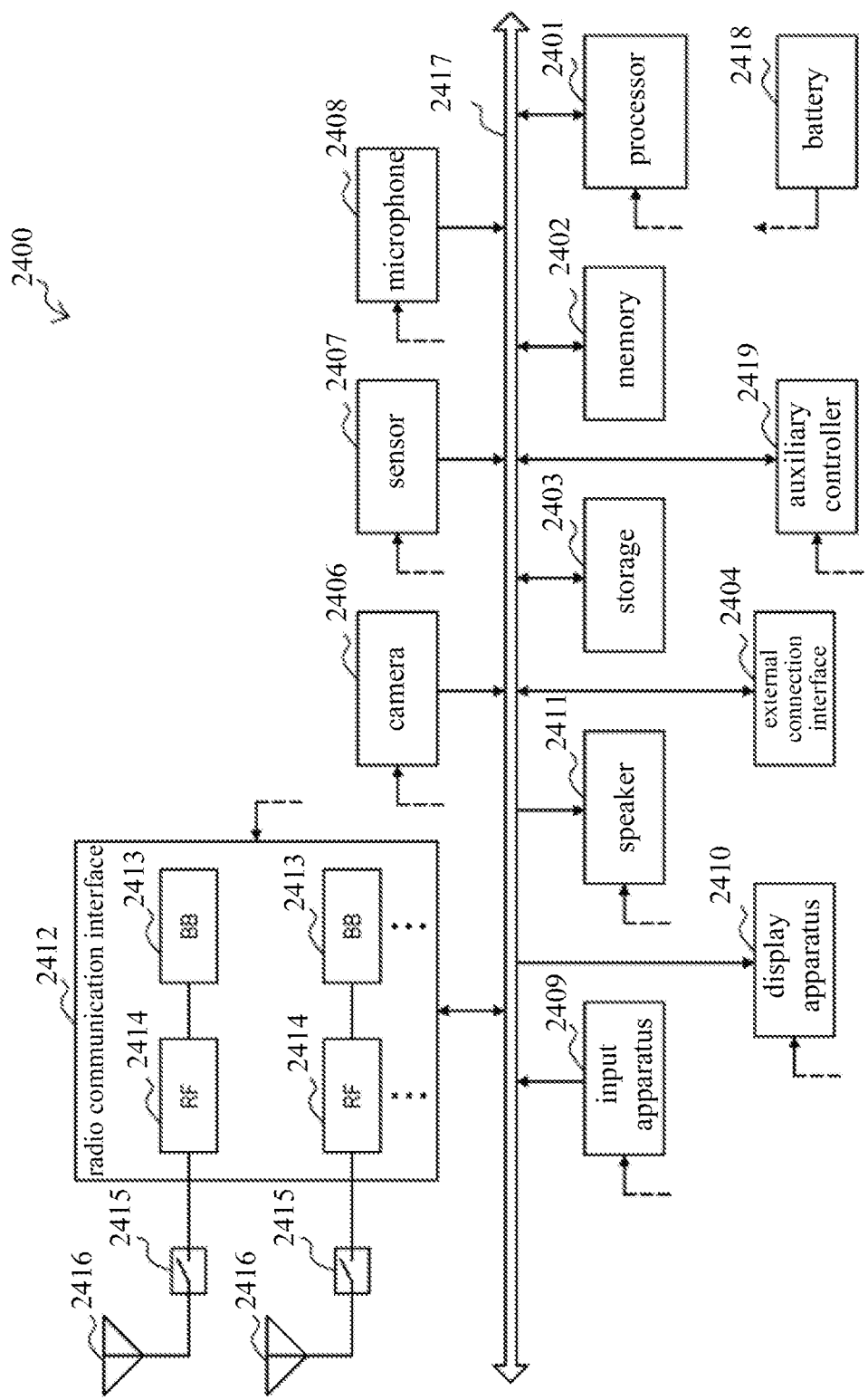
FIG. 24 is a block diagram showing an example of a schematic configuration of a smart phone to which the technology according to the present disclosure may be applied.

FIG. 24 is a block diagram showing an example of a schematic configuration of a smart phone 2400 to which the technology according to the present disclosure may be applied. The smart phone 2400 includes a processor 2401, a memory 2402, a storage 2403, an external connection interface 2404, a camera 2406, a sensor 2407, a microphone 2408, an input apparatus 2409, a display apparatus 2410, a speaker 2411, a radio communication interface 2412, one or more antenna switches 2415, one or more antennas 2416, a bus 2417, a battery 2418, and an auxiliary controller 2419.

The processor 2401 may be, for example, a CPU or a system on a chip (SoC), and controls functions of an application layer and another layer of the smart phone 2400. The memory 2402 includes RAM and ROM, and stores a program that is executed by the processor 2401, and data. The storage 2403 may include a storage medium such as a semiconductor memory and a hard disk. The external connection interface 2404 is an interface for connecting an external apparatus such as a memory card and a universal serial bus (USB) apparatus to the smart phone 2400.

The camera 2406 includes an image sensor such as a charge coupled device (CCD) and a complementary metal oxide semiconductor (CMOS), and generates a captured image. The sensor 2407 may include a group of sensors such as a measurement sensor, a gyro sensor, a geomagnetic sensor, and an acceleration sensor. The microphone 2408 converts sounds that are inputted to the smart phone 2400 into audio signals. The input apparatus 2409 includes, for example, a touch sensor configured to detect touch onto a screen of the display apparatus 2410, a keypad, a keyboard, a button, or a switch, and receive an operation or information inputted from a user. The display apparatus 2410 includes a screen such as a liquid crystal display (LCD) and an organic light-emitting diode (OLED) display, and displays an output image of the smart phone 2400. The speaker 2411 converts audio signals that are outputted from the smart phone 2400 into sounds.

The radio communication interface 2412 supports any cellular communication scheme such as LTE and LTE-Advanced, and performs radio communication. The radio communication interface 2412 may typically include, for example, a base band (BB) processor 2413 and a radio frequency (RF) circuit 2414. The BB processor 2413 may perform, for example, encoding/decoding, modulating/demodulating, and multiplexing/demultiplexing, and performs various types of signal processing for radio communication. Meanwhile, the RF circuit 2414 may include, for example, a mixer, a filter, and an amplifier, and transmits and receives radio signals via the antenna 2416. The radio communication interface 2412 may be a chip module having the BB processor 2413 and the RF circuit 2414 integrated thereon. The radio communication interface 2412 may include multiple BB processors 2413 and multiple RF circuits 2414, as illustrated in FIG. 24 Although FIG. 24 illustrates the example in which the radio communication interface 2412 includes the multiple BB processors 2413 and the multiple RF circuits 2414, the radio communication interface 2412 may also include a single BB processor 2413 or a single RF circuit 2414.

Furthermore, in addition to a cellular communication scheme, the radio communication interface 2412 may support another type of radio communication scheme such as a short-distance radio communication scheme, a near field communication scheme, and a radio local area network (LAN) scheme. In this case, the radio communication interface 2412 may include the BB processor 2413 and the RF circuit 2414 for each radio communication scheme.

Each of the antenna switches 2415 switches connection destinations of the antennas 2416 among multiple circuits (such as circuits for different radio communication schemes) included in the radio communication interface 2412.

Each of the antennas 2416 includes a single or multiple antenna elements (such as multiple antenna elements included in an MIMO antenna), and is used for the radio communication interface 2412 to transmit and receive radio signals. The smart phone 2400 may include the multiple antennas 2416, as illustrated in FIG. 24. Although FIG. 24 illustrates the example in which the smart phone 2400 includes the multiple antennas 2416, the smart phone 2400 may also include a single antenna 2416.

Furthermore, the smart phone 2400 may include the antenna 2416 for each radio communication scheme. In this case, the antenna switches 2415 may be omitted from the configuration of the smart phone 2400.

The bus 2417 connects the processor 2401, the memory 2402, the storage 2403, the external connection interface 2404, the camera 2406, the sensor 2407, the microphone 2408, the input apparatus 2409, the display apparatus 2410, the speaker 2411, the radio communication interface 2412, and the auxiliary controller 2419 to each other. The battery 2418 supplies power to blocks of the smart phone 2400 illustrated in FIG. 24 via feeder lines, which are partially shown as dashed lines in the figure. The auxiliary controller 2419 operates a minimum necessary function of the smart phone 2400, for example, in a sleep mode.

In the smart phone 2400 shown in FIG. 24, the transceiver or the transceiver unit of the information processing device for user equipment side according to the embodiment of the disclosure may be implemented by the radio communication interface 2412. At least a part of functions of the processing circuitry and/or the units of electronic device or the information processing device for user equipment side according to the embodiment of the disclosure may be implemented by the processor 2401 or the auxiliary controller 2419. For example, power consumption of the battery 2418 may be reduced by performing a part of the functions of the processor 2401 by the auxiliary controller 2419. In addition, the processor 2401 or the auxiliary controller 2419 may perform at least a part of the functions of the processing circuitry and/or the units of the electronic device or the information processing device for the user equipment side according to the embodiment of the disclosure by executing programs stored in the memory 2402 or the storage 2403.

Application Example of a Base Station

Figure 25:
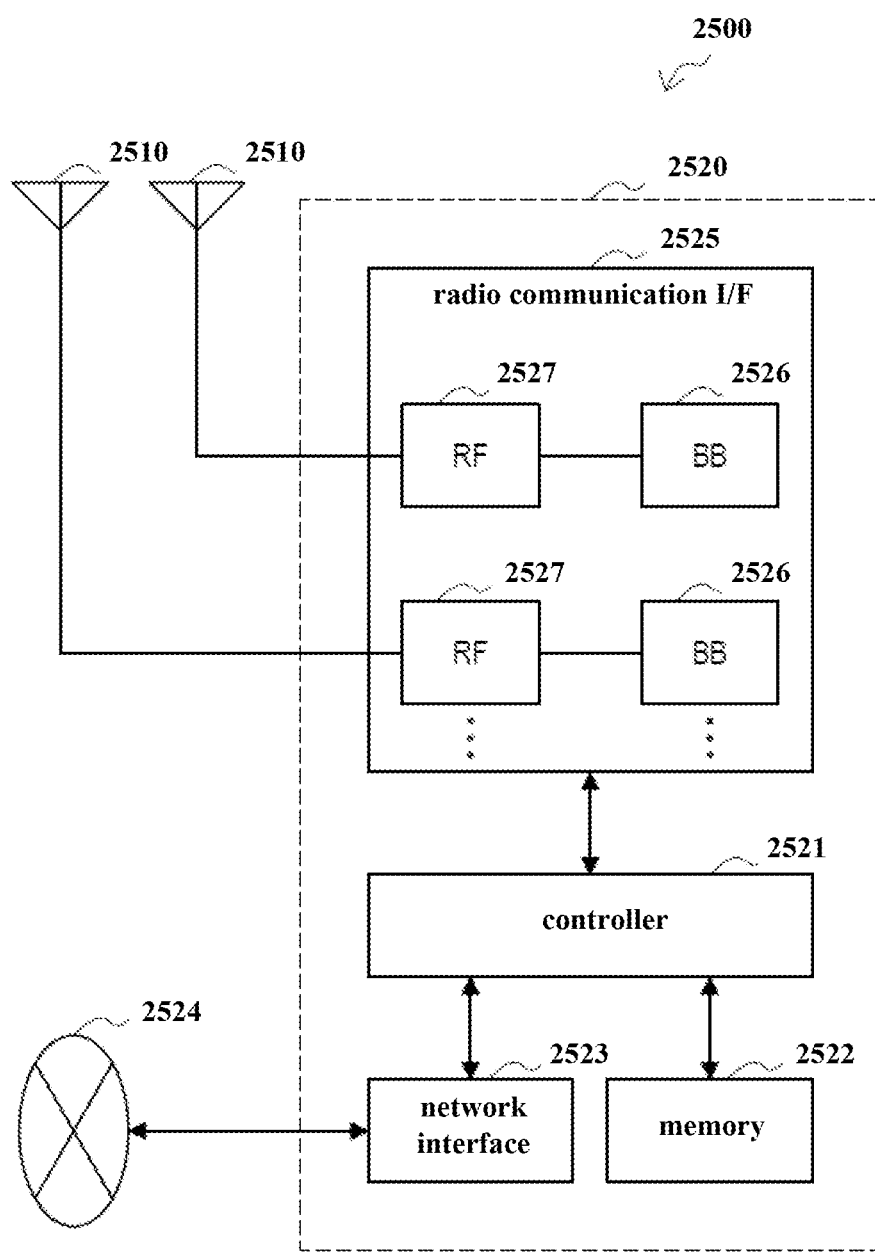
FIG. 25 is a block diagram showing an example of a schematic configuration of an eNB (evolved Node B) to which the technology according to the present disclosure may be applied.

FIG. 25 is a block diagram showing an example of a schematic configuration of an eNB to which the technology according to the present disclosure may be applied. An eNB 2500 includes one or more antennas 2510 and a base station device 2520. The base station device 2520 and each antenna 2510 may be connected to each other via a radio frequency (RF) cable.

Each of the antennas 2510 includes one or more antenna elements (such as multiple antenna elements included in a multiple input multiple output (MIMO) antenna) and is used by the base station device 2520 to transmit and receive a radio signal. As shown in FIG. 25, the eNB 2500 may include multiple antennas 2510. For example, the multiple antennas 2510 may be compatible with multiple frequency bands used by the eNB 2500. Although FIG. 25 shows an example in which the eNB 2500 includes multiple antennas 2510, the eNB 2500 may include a single antenna 2510.

The base station device 2520 includes a controller 2521, a memory 2522, a network interface 2525 and a radio communication interface 2525.

The controller 2521 may be a CPU or a DSP and control various functions of higher layers of the base station device 2520. For example, the controller 2521 generates a data packet based on data in a signal processed by the radio communication interface 2525, and transfers the generated packet via a network interface 2523. The controller 2521 may bind data from multiple baseband processors to generate a binding packet and transfer the generated binding packet. The controller 2521 may have logic functions for performing the following control: radio resource control, radio carrying control, mobility management, admission control and schedule. The control may be performed in combination with an adjacent eNB or a core network node.

The memory 2522 includes RAM and ROM, and stores programs executed by the controller 2521 and various types of control data (such as a terminal list, transmission power data and scheduling data).

The network interface 2523 is configured to connect the base station device 2520 to a communication interface of the core network 2524. The controller 2521 may communication with the core network node or another eNB via the network interface 2523. In this case, the eNB 2500 and the core network node or another eNB may be connected to each other via a logic interface (such as an S1 interface and an X2 interface). The network interface 2523 may be a wired communication interface or a radio communication interface for a wireless backhaul line. If the network interface 2523 is a radio communication interface, the network interface 2523 may use a higher frequency band for wireless communication as compared with the frequency band used by the radio communication interface 2525.

The radio communication interface 2525 supports any cellular communication scheme (such as long term evolution (LTE) and LTE-advanced), and provides a radio connection to a terminal located in a cell of the eNB 2500 via an antenna 2510. The radio communication interface 2525 may generally include a BB processor 2526 and an RF circuit 2527. The BB processor 2526 may perform for example encoding/decoding, modulating/demodulating and multiplexing/demultiplexing, and various types of signal processing of layers (such as L1, medium access control (MAC), radio link control (RLC) and packet data convergence protocol (PDCP)). Instead of the controller 2521, the BB processor 2526 may have a part or all of the above logic functions. The BB processor 2526 may be a memory storing communication control programs or a module including a processor configured to execute programs and a related circuit. Updating programs may change functions of the BB processor 2526. The module may be a card or a blade inserted into a slot of the base station device 2520. Alternatively, the module may be a chip installed on the card or the blade. The RF circuit 2527 may include for example a mixer, a filter or an amplifier, and transmits and receives a radio signal via the antenna 2510.

As shown in FIG. 25, the radio communication interface 2525 may include multiple BB processors 2526. For example, the multiple BB processors 2526 may be compatible with multiple frequency bands used by the eNB 2500. As shown in FIG. 25, the radio communication interface 2525 may include multiple RF circuits 2527. For example, the multiple RF circuits 2527 may be compatible with multiple antenna elements. Although FIG. 25 shows an example in which the radio communication interface 2525 includes multiple BB processors 2526 and multiple RF circuits 2527, the radio communication interface 2525 may include a single BB processor 2526 or a single RF circuit 2527.

In the eNB 2500 shown in FIG. 25, the transceiver and the transceiver unit of the information processing device for base station side according to the embodiment of the disclosure may be implemented by the radio communication interface 2525. At least a part of the functions of the processing circuitry and/or the units of the electronic device or the information processing device according to the embodiment of the disclosure may be implemented by the controller 2521. For example, the controller 2521 may perform at least a part of the functions of the processing circuitry and/or the units of the electronic device or the information processing device according to the embodiment of the disclosure by performing the programs stored in the memory 2522.

In the description of specific embodiments of the present disclosure above, features described and/or illustrated for one embodiment may be used in one or more other embodiments in the same or similar manner, combined with features in other embodiments, or substitute for features in other embodiments.

It should be noted that, terms "including/comprising" used herein refer to existing of features, elements, steps or components, but existing or adding of one or more other features, elements, steps or components is not excluded.

In the above embodiments and examples, reference numerals consisting of numbers are used to indicate various steps and/or units. Those skilled in the art should understand that the reference numerals are used to facilitate describing and drawing, and are not intended to indicate an order or limit in any way.

In addition, the method according to the present disclosure is not limited to be performed in a time order described in the description, and may be performed according to other time orders, in parallel or independently. Therefore, the order in which the method described in the description is performed does not limit the technical scope of the present disclosure.

Although the present disclosure is disclosed by the description of specific embodiments of the present disclosure above, it should be understood that all the embodiments and examples described above are only schematic and are not intended to limit. For those skilled in the art, various changes, improvements or equivalents may be designed for the present disclosure within the spirit and scope of the appended claims. The changes, improvements or equivalents should be regarded as falling within the protection scope of the present disclosure.

The invention claimed is:

1. An electronic device for user equipment side, comprising:
   a processing circuitry configured to:
   select a mode of a relay discovering process of a user equipment, wherein the mode determines, in the relay discovering process, whether to discover a remote device or to be discovered by the remote device when the user equipment serves as a relay device, or whether to discover the relay device or to be discovered by the relay device when the user equipment serves as the remote device, wherein after a connection is established between the relay device and the remote device, the remote device obtains a communication service via the relay device through a Proximity-based Service communication; and
   control the user equipment to perform the relay discovering process in accordance with the selected mode and to receive a signal from a base station,
   wherein the processing circuitry is further configured to select the mode according to a result from a detection of discovery signals from other user equipment and according to a reception of an indication of the mode from a base station, and
   wherein the detection and the selection are performed individually for each carrier configured for the Proximity-based Service communication, and wherein the user equipment pre-selects the discovery mode for each configured carrier.

2. The electronic device according to claim 1, wherein the mode is selected from a first mode and a second mode:
   in the first mode, a first discovery signal is transmitted by the relay device, a response to the first discovery signal is made by the remote device intended to establish a connection with the relay device; and
   in the second mode, a second discovery signal is transmitted by the remote device, a response to the second discovery signal is made by the relay device intended to establish a connection with the remote device.

3. The electronic device according to claim 2, wherein the processing circuitry is further configured to: control the user equipment to detect the first discovery signal in a case where the user equipment serves as the remote device; and
   the selection comprises: selecting the first mode if an intensity of the first discovery signal is higher than a first threshold.

4. The electronic device according to claim 2, wherein the processing circuitry is further configured to: control the user equipment to detect the second discovery signal in a case where the user equipment serves as the relay device; and
   the selection comprises: selecting the second mode if an intensity of the second discovery signal is higher than a second threshold.

5. The electronic device according to claim 1, wherein the processing circuitry is further configured to control the user equipment to transmit information indicating a position of the user equipment to the base station, and
   the mode indicated by the base station is determined by the base station according to relay discovering modes of user equipments in a predetermined area where the user equipment lies.

6. The electronic device according to claim 1, wherein the processing circuitry is further configured to: in a case where the mode has been selected,
   control the user equipment to detect discovery signals from other user equipments; and
   switch the selection of the mode according to a variation of the discovery signals from other user equipments.

7. The electronic device according to claim 2, wherein the processing circuitry is further configured to:
   control the user equipment to detect the intensity of the second discovery signal in a case where the first mode has been selected and the user equipment serves as the relay device; and
   switch to the second mode if the intensity of the second discovery signal is higher than a third threshold and an increasing rate of the intensity of the second discovery signal is greater than a fourth threshold.

8. The electronic device according to claim 2, wherein the processing circuitry is further configured to:
   control the user equipment to detect the intensity of the second discovery signal in a case where the second mode has been selected and the user equipment serves as the relay device; and
   switch to the first mode if the intensity of the second discovery signal is lower than a fifth threshold and a decreasing rate of the intensity of the second discovery signal is greater than a sixth threshold.

9. The electronic device according to claim 2, wherein the processing circuitry is further configured to:
   control the user equipment to detect the intensity of the first discovery signal in a case where the first mode has been selected and the user equipment serves as the remote device; and
   switch to the second mode if the intensity of the first discovery signal is lower than a seventh threshold and a decreasing rate of the intensity of the first discovery signal is greater than an eighth threshold.

10. The electronic device according to claim 2, wherein the processing circuitry is further configured to:
- control the user equipment to detect the intensity of the first discovery signal in a case where the second mode has been selected and the user equipment serves as the remote device; and
- switch to the first mode if the intensity of the first discovery signal is higher than a ninth threshold and an increasing rate of the intensity of the first discovery signal is greater than a tenth threshold.

11. The electronic device according to claim 5, wherein the switching of the mode is performed only if a switching condition is satisfied continuously over a predetermined hysteresis time.

12. The electronic device according to claim 1, wherein the processing circuitry is further configured to: in a case where a relay connection has been established, adjust a parameter for relay discovering according to a communication quality of the relay connection.

13. The electronic device according to claim 12, wherein the communication quality comprises a PC5 link quality between the relay device and the remote device, and/or
- wherein the parameter comprises a transmission period of a relay discovery signal.

14. The electronic device according to claim 12, wherein the processing circuitry is configured to: in a case where two or more relay connections have been established, adjust the parameter according to an average communication quality of the two or more relay connections.

15. An information processing method for user equipment side, comprising:
- selecting a mode of a relay discovering process of a user equipment, wherein the mode determines, in the relay discovering process, whether to discover a remote device or to be discovered by the remote device when the user equipment serves as a relay device, or whether to discover the relay device or to be discovered by the relay device when the user equipment serves as the remote device, wherein after a connection is established between the relay device and the remote device, the remote device obtains a communication service via the relay device through a Proximity-based Service communication; and
- performing the relay discovering process in accordance with the selected mode and receiving a signal from a base station,
- wherein the mode is selected according to a result from a detection of discovery signals from other user equipment and according to a reception of an indication of the mode from a base station, and
- wherein the detection and the selection are performed individually for each carrier configured for the Proximity-based Service communication, and wherein the user equipment pre-selects the discovery mode for each configured carrier.

16. The electronic device according to claim 1, wherein a retransmission of a discovery message, transmitted from the user equipment to the other user equipment, is determined based on power consumption and discovery performance.

* * * * *